US007843533B2

(12) United States Patent
Noguchi et al.

(10) Patent No.: US 7,843,533 B2
(45) Date of Patent: Nov. 30, 2010

(54) LIQUID CRYSTAL DISPLAY WITH TRANSMISSION AND REFLECTION REGIONS

(75) Inventors: Noboru Noguchi, Tenri (JP); Hisashi Nagata, Yokohama (JP); Toshihiro Matsumoto, Nara (JP); Kazuhiko Tsuda, Ikoma-gun (JP); Makoto Kanbe, Sakurai (JP); Akihiko Kojima, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 1177 days.

(21) Appl. No.: 11/353,952

(22) Filed: Feb. 15, 2006

(65) Prior Publication Data

US 2006/0125755 A1 Jun. 15, 2006

Related U.S. Application Data

(63) Continuation of application No. 10/244,820, filed on Sep. 17, 2002, now Pat. No. 7,084,849.

(30) Foreign Application Priority Data

Sep. 18, 2001 (JP) ............................ 2001-283001
Feb. 25, 2002 (JP) ............................ 2002-048244
Sep. 6, 2002 (JP) ............................ 2002-261514

(51) Int. Cl.
*G02F 1/1335* (2006.01)
*G02F 1/1343* (2006.01)

(52) U.S. Cl. ...................................... 349/114; 349/147

(58) Field of Classification Search ................. 349/114, 349/147

See application file for complete search history.

(56) References Cited

U.S. PATENT DOCUMENTS 4,605,977 A 8/1986 Matthews
4,853,810 A 8/1989 Pohl et al.
5,438,342 A 8/1995 Yamaguchi (Continued)

FOREIGN PATENT DOCUMENTS

JP 4-223428 A 8/1992

(Continued)

OTHER PUBLICATIONS

U.S. Appl. No. 10/244,820, filed Sep. 17, 2002.

(Continued)

*Primary Examiner*—David Nelms
*Assistant Examiner*—Nathanael R Briggs
(74) *Attorney, Agent, or Firm*—Nixon & Vanderhye P.C.

(57) ABSTRACT

A liquid crystal display device includes: pixel electrodes arranged in columns and rows, each including a reflective electrode region; scanning lines; and signal lines. The device sequentially supplies a scanning signal voltage to one of the scanning lines after another to select one group of pixel electrodes, connected to the same one of the scanning lines, after another, and then supplies display signal voltages to the selected group of pixel electrodes by way of the signal lines, thereby displaying an image thereon. The pixel electrodes are arranged such that the polarity of a voltage to be applied to a liquid crystal layer is inverted for every predetermined number of pixel electrodes in each of the rows and in each of the columns. The display signal voltage to be supplied to each pixel electrode is updated at a frequency of 45 Hz or less.

12 Claims, 22 Drawing Sheets

U.S. PATENT DOCUMENTS

| | | | | |
|---|---|---|---|---|
| 5,764,324 | A | 6/1998 | Lu et al. | |
| 5,991,883 | A | 11/1999 | Atkinson | |
| 6,195,140 | B1 * | 2/2001 | Kubo et al. | 349/44 |
| 6,429,842 | B1 | 8/2002 | Shin et al. | |
| 6,452,654 | B2 * | 9/2002 | Kubo et al. | 349/114 |
| 6,683,666 | B1 * | 1/2004 | Jang et al. | 349/113 |
| 2002/0033918 | A1 * | 3/2002 | Shigeno et al. | 349/114 |
| 2002/0051104 | A1 | 5/2002 | Kurata | |

FOREIGN PATENT DOCUMENTS

| | | | |
|---|---|---|---|
| JP | 05-134629 | | 5/1993 |
| JP | 2000-305110 | A | 11/2000 |
| JP | 2002-14321 | A | 1/2002 |
| KR | 2000-0001129 | | 1/2000 |
| KR | 2001-0025955 | | 4/2001 |

OTHER PUBLICATIONS

U.S. Appl. No. 09/856,926, filed Apr. 28, 20002 entitled "Display Device, Method of Driving Same and Electronic Device Mounting Same".

Korean Office Action issued on Oct. 4, 2005 (w/English translation).

* cited by examiner

LIQUID CRYSTAL DISPLAY WITH TRANSMISSION AND REFLECTION REGIONS

This application is a Continuation of application Ser. No. 10/244,820, filed Sep. 17, 2002, now U.S. Pat. No. 7,084,849 the entire content of which is hereby incorporated herein by reference in this application.

BACKGROUND OF THE INVENTION

1. Field of the Invention

The present invention relates to a liquid crystal display device, and more particularly relates to a liquid crystal display device that can display an image of quality with its power dissipation reduced by utilizing reflected light.

2. Description of the Related Art

As various types of portable electronic appliances, including cell phones and personal digital assistants (PDAs), have become more and more popularized, liquid crystal display devices, which are often built in these appliances, are increasingly required to reduce their power dissipation. Meanwhile, the amount of information to be displayed on the liquid crystal display devices has also been on the rise. Thus, the liquid crystal display devices also have to further improve the quality of an image to be displayed thereon.

To provide a liquid crystal display device that can display an image of quality with its power dissipation reduced, the present inventors carried out an intensive research on a method of driving a TFT liquid crystal display device of the reflection type at a decreased frequency. As a result of experiments, the present inventors discovered and confirmed that if the image on the display is refreshed at a decreased rate, then a flicker (or variation in brightness) is produced and cannot be eliminated even by adjusting the so-called “counter voltage shift”. Hereinafter, the relationship between the flicker and the counter voltage shift will be described.

In a TFT liquid crystal display device, a feedthrough phenomenon occurs in the voltage being applied to pixel electrodes due to the parasitic capacitance formed by its TFTs and the switching operations of the TFTs. Accordingly, to compensate for such a feedthrough voltage, an offset voltage, which has its amplitude defined in accordance with the feedthrough voltage, is applied to a counter electrode that is disposed so as to face the pixel electrodes by way of a liquid crystal layer.

However, if the feedthrough voltage is not equal to the offset voltage (the difference between the feedthrough and offset voltages is sometimes called a “counter voltage shift”), then the effective voltage to be applied to the liquid crystal layer changes every time the polarity of the voltage is inverted. As a result, the observer senses that voltage variation as a flicker.

Even for a normal liquid crystal display device to be driven at a refresh rate of 60 Hz, various countermeasures are taken to make such a flicker as insensible as possible. Examples of those countermeasures include a so-called “gate line inversion” (which is also called a “1H inversion”) technique, by which the polarity of the applied voltage is inverted on a gate line basis. However, the counter voltage shift might sometimes be too great to be eliminated by any of those countermeasures. In that case, the flicker might be sensed just like a moving striped pattern.

The present inventors carried out experiments on a reflective liquid crystal display device having pixel pitches of 60 μm×RGB×180 μm to find a counter voltage shift value at which no flicker was perceivable in a half-tone display state.

Consequently, the present inventors discovered and confirmed that where the observer was watching the image on the display carefully, a counter voltage shift of about 250 mV resulted in a quite perceivable flicker even when the device was driven by the gate line inversion technique.

If the liquid crystal display device is driven at a decreased frequency to reduce its power dissipation, that flicker resulting from the counter voltage shift gets even more noticeable. For example, if the device is driven at 5 Hz, even a counter voltage shift of as small as 30 mV makes the line-by-line difference in brightness between the gate lines easily perceivable. What is worse, the refresh period (i.e., vertical scanning period) is as long as 200 ms. Accordingly, in that case, the observer can clearly see with his or her own eyes how bright and dark lines are alternated on a vertical scanning period basis. Thus, such a liquid crystal display device is far from being a commercially viable product.

That counter voltage shift of about 30 mV is so small as to be easily created due to any of a number of inevitably occurring variations that include: a variation in thickness of the liquid crystal layer during the manufacturing process; a small variation in temperature of the liquid crystal layer according to the operating environment; and degradation in electrical or physical properties of the liquid crystal material or alignment film material with time. Nevertheless, when a huge number of liquid crystal display devices should be produced, it is very difficult to reduce the counter voltage shift to less than 30 mV by adjusting the offset voltage to be applied to the counter electrode. A counter voltage shift that can be compensated for by the currently available technique is at least about 100 mV.

The present inventors discovered and confirmed via experiments that when the refresh rate is about 45 Hz or less, the flicker is too much noticeable to be eliminated by any of the currently available counter voltage shift adjustment techniques.

The results of our experiments also revealed that the flicker is perceivable particularly easily in a reflective/transmissive liquid crystal display device (which will be herein referred to as a “dual-mode liquid crystal display device”) in which each pixel thereof includes a reflective portion for conducting a display operation in a reflection mode and a transmissive portion for conducting a display operation in a transmission mode. In the dual-mode liquid crystal display device, the flicker also becomes particularly noticeable when the refresh rate is as low as about 45 Hz or less. However, in the device of this type, the flicker is perceivable even more easily than a reflective or transmissive device. Accordingly, some countermeasure must always be taken for the dual-mode device, not just when the device is driven at a decreased frequency.

SUMMARY OF THE INVENTION

In order to overcome the problems described above, an object of the present invention is to provide a liquid crystal display device that produces a hardly perceivable flicker even when the device is driven with its power dissipation reduced.

A more specific object of the present invention is to provide a liquid crystal display device that can display an image of quality thereon almost without allowing the observer to perceive any flicker even when driven at a low frequency of 45 Hz or less.

A liquid crystal display device according to a preferred embodiment of the present invention preferably includes pixel electrodes, scanning lines, signal lines, switching elements, a liquid crystal layer, and at least one counter electrode. The pixel electrodes are preferably arranged in columns and rows and each of the pixel electrodes preferably includes a reflective electrode region. The scanning lines preferably extend in a row direction, while the signal lines preferably extend in a column direction. Each of the switching elements is preferably provided for an associated one of the pixel electrodes and is preferably connected to the associated pixel electrode, an associated one of the scanning lines and an associated one of the signal lines. The at least one counter electrode preferably faces the pixel electrodes by way of the liquid crystal layer. The liquid crystal display device preferably supplies sequentially a scanning signal voltage to one of the scanning lines after another to select one group of pixel electrodes, which are connected to the same one of the scanning lines, after another from the pixel electrodes, and then supplies display signal voltages to the selected group of pixel electrodes by way of the signal lines, thereby displaying an image thereon. The pixel electrodes are preferably arranged in such a manner that the polarity of a voltage to be applied to the liquid crystal layer is inverted for every predetermined number of pixel electrodes in each of the rows and in each of the columns. The display signal voltage to be supplied to each of the pixel electrodes is preferably updated at a frequency of 45 Hz or less.

In one preferred embodiment of the present invention, the switching elements that are connected to one of the scanning lines preferably include: a first group of switching elements, which are connected to the pixel electrodes belonging to one of two rows that are adjacent to the scanning line; and a second group of switching elements, which are connected to the pixel electrodes belonging to the other adjacent row. The first and second groups of switching elements are preferably arranged along the scanning line such that every predetermined number of switching elements of the first group are followed by every predetermined number of switching elements of the second group. The polarity of the voltage to be applied to the liquid crystal layer is preferably inverted for every group of pixel electrodes that are connected to their associated predetermined number of signal lines.

In an alternative preferred embodiment, the switching elements that are connected to one of the signal lines preferably include: a first group of switching elements, which are connected to the pixel electrodes belonging to one of two columns that are adjacent to the signal line; and a second group of switching elements, which are connected to the pixel electrodes belonging to the other adjacent column. The first and second groups of switching elements are preferably arranged along the signal line such that every predetermined number of switching elements of the first group are followed by every predetermined number of switching elements of the second group. The polarity of the voltage to be applied to the liquid crystal layer is preferably inverted for every group of pixel electrodes that are connected to their associated predetermined number of scanning lines.

In another preferred embodiment of the present invention, each of the pixel electrodes is preferably a reflective electrode. In that case, the pixel electrodes preferably have mutually congruent planar shapes and are preferably arranged so as to overlap with each other substantially entirely when translated in the row direction or in the column direction.

In still another preferred embodiment, each of the pixel electrodes preferably includes the reflective electrode region and a transmissive electrode region.

In this particular preferred embodiment, a shift width of geometric centers of mass of the transmissive electrode regions of the pixel electrodes as measured in the row direction or in the column direction is preferably half or less of the pitch of the pixel electrodes as measured in the row direction or in the column direction.

More specifically, the transmissive electrode regions of the pixel electrodes preferably have mutually congruent planar shapes and are preferably arranged so as to overlap with each other substantially entirely when translated in the row direction or in the column direction.

In yet another preferred embodiment, the switching elements that are connected to one of the scanning lines preferably include: a first group of switching elements, which are connected to the pixel electrodes belonging to one of the rows that is adjacent to, and located over, the scanning line; and a second group of switching elements, which are connected to the pixel electrodes belonging to one of the rows that is adjacent to, and located under, the scanning line. The first and second groups of switching elements are preferably arranged along the scanning line such that every predetermined number of switching elements of the first group are followed by every predetermined number of switching elements of the second group. A distance from each of the switching elements of the first group to a geometric center of mass of the transmissive electrode region of the pixel electrode that is connected to the switching element of the first group is preferably different from a distance from each of the switching elements of the second group to a geometric center of mass of the transmissive electrode region of the pixel electrode that is connected to the switching element of the second group.

In yet another preferred embodiment, each of the pixel electrodes preferably includes only one transmissive electrode region that is surrounded with the reflective electrode region.

In yet another preferred embodiment, a storage capacitor is preferably formed below the reflective electrode region.

In yet another preferred embodiment, the pixel electrodes preferably define multiple pixels, respectively. Each of the pixels preferably includes a reflective portion that is defined by the reflective electrode region and a transmissive portion that is defined by the transmissive electrode region. An electrode potential difference created between the electrodes of the reflective portion is preferably approximately equal to an electrode potential difference created between the electrodes of the transmissive portion.

In this particular preferred embodiment, the reflective electrode region preferably includes: a reflective conductive layer; and a transparent conductive layer, which is provided on one surface of the reflective conductive layer so as to face the liquid crystal layer.

More specifically, the transparent conductive layer is preferably amorphous.

Preferably, a difference in work function between the transparent conductive layer and the transmissive electrode region is preferably within 0.3 eV.

More particularly, the transmissive electrode region is preferably made of an ITO layer, the reflective conductive layer preferably includes an Al layer, and the transparent conductive layer is preferably made of an oxide layer mainly composed of indium oxide and zinc oxide.

In yet another preferred embodiment, the transparent conductive layer preferably has a thickness of 1 nm to 20 nm.

In yet another preferred embodiment, the pixel electrodes preferably define multiple pixels, respectively. Each of the pixels preferably includes a reflective portion that is defined by the reflective electrode region and a transmissive portion that is defined by the transmissive electrode region. To substantially compensate for a difference between an electrode potential difference created in the reflective portion and an electrode potential difference created in the transmissive portion, alternating current signal voltages having mutually different center levels are preferably applied to respective portions of the liquid crystal layer that correspond to the reflective portion and the transmissive portion.

In this particular preferred embodiment, the at least one counter electrode preferably includes: a first counter electrode that faces the reflective electrode regions of the pixel electrodes; and a second counter electrode that faces the transmissive electrode regions of the pixel electrodes. The first and second counter electrodes are preferably electrically isolated from each other.

Specifically, each of the first and second counter electrodes is preferably formed in the shape of a comb that has a plurality of branches extending in the row direction.

More specifically, counter signal voltages to be applied to the first and second counter electrodes are preferably alternating current signal voltages that have the same polarity, the same period and the same amplitude but have mutually different center levels.

In yet another preferred embodiment, the reflective portion preferably includes: a reflective portion liquid crystal capacitor, which is defined by the reflective electrode regions, the first counter electrode, and portions of the liquid crystal layer located between the reflective electrode regions and the first counter electrode; and a first storage capacitor, which is electrically connected in parallel to the reflective portion liquid crystal capacitor. The transmissive portion preferably includes: a transmissive portion liquid crystal capacitor, which is defined by the transmissive electrode regions, the second counter electrode, and portions of the liquid crystal layer located between the transmissive electrode regions and the second counter electrode; and a second storage capacitor, which is electrically connected in parallel to the transmissive portion liquid crystal capacitor. The alternating current signal voltage that is applied to the first counter electrode is preferably also applied to a first storage capacitor counter electrode that the first storage capacitor includes. The alternating current signal voltage that is applied to the second counter electrode is preferably also applied to a second storage capacitor counter electrode that the second storage capacitor includes.

A liquid crystal display device according to another preferred embodiment of the present invention preferably includes pixel electrodes, scanning lines, signal lines, switching elements, a liquid crystal layer and at least one counter electrode. The pixel electrodes are preferably arranged in columns and rows. Each of the pixel electrodes preferably includes a reflective electrode region and a transmissive electrode region. The scanning lines preferably extend in a row direction, while the signal lines preferably extend in a column direction. Each of the switching elements is preferably provided for an associated one of the pixel electrodes and is preferably connected to the associated pixel electrode, an associated one of the scanning lines and an associated one of the signal lines. The at least one counter electrode preferably faces the pixel electrodes by way of the liquid crystal layer. The liquid crystal display device preferably sequentially supplies a scanning signal voltage to one of the scanning lines after another to select one group of pixel electrodes, which are connected to the same one of the scanning lines, after another from the pixel electrodes, and then preferably supplies display signal voltages to the selected group of pixel electrodes by way of the signal lines, thereby displaying an image thereon. The pixel electrodes are preferably arranged in such a manner that the polarity of a voltage to be applied to the liquid crystal layer is inverted for every predetermined number of pixel electrodes in each of the rows and in each of the columns. A shift width of geometric centers of mass of the transmissive electrode regions of the pixel electrodes as measured in the row direction or in the column direction is preferably half or less of the pitch of the pixel electrodes as measured in the row direction or in the column direction.

In one preferred embodiment of the present invention, the switching elements that are connected to one of the scanning lines preferably include: a first group of switching elements, which are connected to the pixel electrodes belonging to one of two rows that are adjacent to the scanning line; and a second group of switching elements, which are connected to the pixel electrodes belonging to the other adjacent row. The first and second groups of switching elements are preferably arranged along the scanning line such that every predetermined number of switching elements of the first group are followed by every predetermined number of switching elements of the second group. The polarity of the voltage to be applied to the liquid crystal layer is preferably inverted for every group of pixel electrodes that are connected to their associated predetermined number of signal lines.

In another preferred embodiment of the present invention, the switching elements that are connected to one of the signal lines preferably include: a first group of switching elements, which are connected to the pixel electrodes belonging to one of two columns that are adjacent to the signal line; and a second group of switching elements, which are connected to the pixel electrodes belonging to the other adjacent column. The first and second groups of switching elements are preferably arranged along the signal line such that every predetermined number of switching elements of the first group are followed by every predetermined number of switching elements of the second group. The polarity of the voltage to be applied to the liquid crystal layer is preferably inverted for every group of pixel electrodes that are connected to their associated predetermined number of scanning lines.

In still another preferred embodiment of the present invention, the transmissive electrode regions of the pixel electrodes preferably have mutually congruent planar shapes and are preferably arranged so as to overlap with each other substantially entirely when translated in the row direction or in the column direction.

In yet another preferred embodiment, the switching elements that are connected to one of the scanning lines preferably include: a first group of switching elements, which are connected to the pixel electrodes belonging to one of the rows that is adjacent to, and located over, the scanning line; and a second group of switching elements, which are connected to the pixel electrodes belonging to one of the rows that is adjacent to, and located under, the scanning line. The first and second groups of switching elements are preferably arranged along the scanning line such that every predetermined number of switching elements of the first group are followed by every predetermined number of switching elements of the second group. A distance from each of the switching elements of the first group to a geometric center of mass of the transmissive electrode region of the pixel electrode that is connected to the switching element of the first group is preferably different from a distance from each of the switching elements of the second group to a geometric center of mass of the transmissive electrode region of the pixel electrode that is connected to the switching element of the second group.

In yet another preferred embodiment, each of the pixel electrodes may include only one transmissive electrode region that is surrounded with the reflective electrode region.

In yet another preferred embodiment, a storage capacitor may be formed below the reflective electrode region.

In yet another preferred embodiment, the pixel electrodes preferably define multiple pixels, respectively. Each of the pixels preferably includes a reflective portion that is defined by the reflective electrode region and a transmissive portion that is defined by the transmissive electrode region. An electrode potential difference created between the electrodes of the reflective portion is preferably approximately equal to an electrode potential difference created between the electrodes of the transmissive portion.

In this particular preferred embodiment, the reflective electrode region preferably includes: a reflective conductive layer; and a transparent conductive layer, which is provided on one surface of the reflective conductive layer so as to face the liquid crystal layer.

Specifically, the transparent conductive layer is preferably amorphous.

More specifically, a difference in work function between the transparent conductive layer and the transmissive electrode region is preferably within 0.3 eV.

In a specific preferred embodiment of the present invention, the transmissive electrode region is preferably made of an ITO layer, the reflective conductive layer preferably includes an Al layer, and the transparent conductive layer is preferably made of an oxide layer mainly composed of indium oxide and zinc oxide.

In a specific preferred embodiment, the transparent conductive layer preferably has a thickness of 1 nm to 20 nm.

In yet another preferred embodiment, the pixel electrodes preferably define multiple pixels, respectively. Each of the pixels preferably includes a reflective portion that is defined by the reflective electrode region and a transmissive portion that is defined by the transmissive electrode region. To substantially compensate for a difference between an electrode potential difference created in the reflective portion and an electrode potential difference created in the transmissive portion, alternating current signal voltages having mutually different center levels are preferably applied to respective portions of the liquid crystal layer that correspond to the reflective portion and the transmissive portion.

In this particular preferred embodiment, the at least one counter electrode preferably includes: a first counter electrode that faces the reflective electrode regions of the pixel electrodes; and a second counter electrode that faces the transmissive electrode regions of the pixel electrodes. The first and second counter electrodes are preferably electrically isolated from each other.

Specifically, each of the first and second counter electrodes is preferably formed in the shape of a comb that has a plurality of branches extending in the row direction.

More particularly, counter signal voltages to be applied to the first and second counter electrodes are preferably alternating current signal voltages that have the same polarity, the same period and the same amplitude but have mutually different center levels.

In yet another preferred embodiment, the reflective portion preferably includes: a reflective portion liquid crystal capacitor, which is defined by the reflective electrode regions, the first counter electrode, and portions of the liquid crystal layer located between the reflective electrode regions and the first counter electrode; and a first storage capacitor, which is electrically connected in parallel to the reflective portion liquid crystal capacitor. The transmissive portion preferably includes: a transmissive portion liquid crystal capacitor, which is defined by the transmissive electrode regions, the second counter electrode, and portions of the liquid crystal layer located between the transmissive electrode regions and the second counter electrode; and a second storage capacitor, which is electrically connected in parallel to the transmissive portion liquid crystal capacitor. The alternating current signal voltage that is applied to the first counter electrode is also preferably applied to a first storage capacitor counter electrode that the first storage capacitor includes. The alternating current signal voltage that is applied to the second counter electrode is also preferably applied to a second storage capacitor counter electrode that the second storage capacitor includes.

A liquid crystal display device according to still another preferred embodiment of the present invention preferably includes pixel electrodes, a liquid crystal layer and at least one counter electrode. Each of the pixel electrodes preferably includes a reflective electrode region and a transmissive electrode region. The at least one counter electrode preferably faces the pixel electrodes by way of the liquid crystal layer. The pixel electrodes preferably define multiple pixels, respectively. Each of the pixels preferably includes a reflective portion that is defined by the reflective electrode region and a transmissive portion that is defined by the transmissive electrode region. An electrode potential difference created between the electrodes of the reflective portion is preferably approximately equal to an electrode potential difference created between the electrodes of the transmissive portion.

In one preferred embodiment of the present invention, the reflective electrode region preferably includes: a reflective conductive layer; and a transparent conductive layer, which is provided on one surface of the reflective conductive layer so as to face the liquid crystal layer.

In this particular preferred embodiment, the transparent conductive layer is preferably amorphous.

Specifically, a difference in work function between the transparent conductive layer and the transmissive electrode region is preferably within 0.3 eV.

In a specific preferred embodiment, the transmissive electrode region is preferably made of an ITO layer, the reflective conductive layer preferably includes an Al layer and the transparent conductive layer is preferably made of an oxide layer mainly composed of indium oxide and zinc oxide.

In a specific preferred embodiment, the transparent conductive layer preferably has a thickness of 1 nm to 20 nm.

In another preferred embodiment, in order to substantially compensate for a difference between an electrode potential difference created in the reflective portion and an electrode potential difference created in the transmissive portion, alternating current signal voltages having mutually different center levels are preferably applied to respective portions of the liquid crystal layer that correspond to the reflective portion and the transmissive portion.

In this particular preferred embodiment, the at least one counter electrode preferably includes: a first counter electrode that faces the reflective electrode regions of the pixel electrodes; and a second counter electrode that faces the transmissive electrode regions of the pixel electrodes. The first and second counter electrodes are preferably electrically isolated from each other.

Specifically, each of the first and second counter electrodes is preferably formed in the shape of a comb that has a plurality of branches extending in the row direction.

More specifically, counter signal voltages to be applied to the first and second counter electrodes are preferably alternating current signal voltages that have the same polarity, the same period and the same amplitude but have mutually different center levels.

In yet another preferred embodiment, the reflective portion preferably includes: a reflective portion liquid crystal capacitor, which is defined by the reflective electrode regions, the first counter electrode, and portions of the liquid crystal layer located between the reflective electrode regions and the first counter electrode; and a first storage capacitor, which is electrically connected in parallel to the reflective portion liquid crystal capacitor. The transmissive portion preferably includes: a transmissive portion liquid crystal capacitor, which is defined by the transmissive electrode regions, the second counter electrode, and portions of the liquid crystal layer located between the transmissive electrode regions and the second counter electrode; and a second storage capacitor, which is electrically connected in parallel to the transmissive portion liquid crystal capacitor. The alternating current signal voltage that is applied to the first counter electrode is preferably also applied to a first storage capacitor counter electrode that the first storage capacitor includes. The alternating current signal voltage that is applied to the second counter electrode is preferably also applied to a second storage capacitor counter electrode that the second storage capacitor includes.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
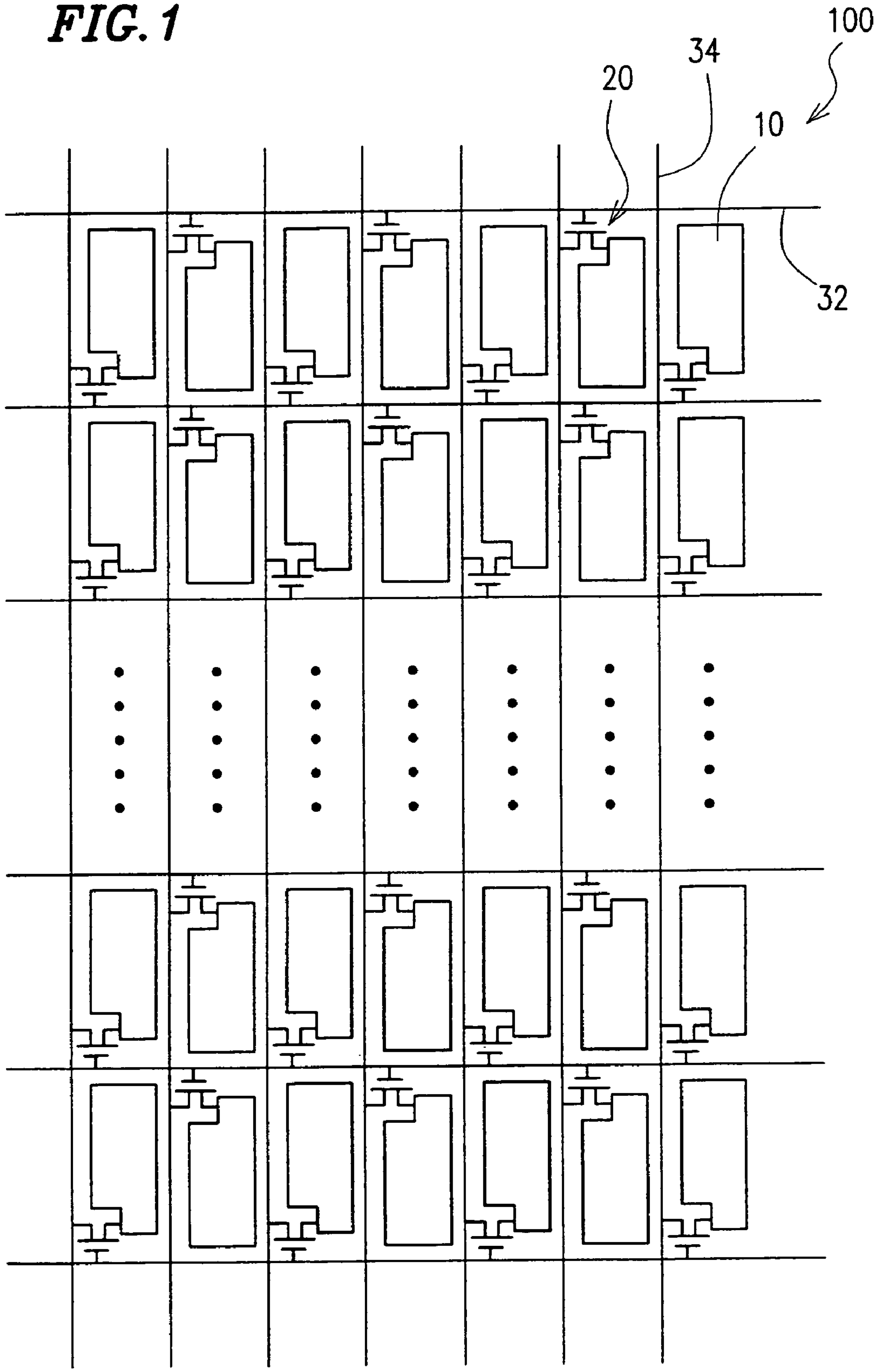
FIG. 1 is a plan view schematically illustrating a layout for a reflective liquid crystal display device 100 according to a first specific preferred embodiment of the present invention.

Hereinafter, preferred embodiments of a liquid crystal display device according to the present invention will be described with reference to the accompanying drawings. A liquid crystal display device according to a preferred embodiment of the present invention is a display device that can conduct a display operation by utilizing at least reflected light. That is to say, the present invention is applicable not only to a normal reflective liquid crystal display device but also to a so-called "semi-transmissive" or "reflective/transmissive (i.e., dual-mode)" liquid crystal display device, in which each pixel electrode thereof includes a reflective electrode region and a transmissive electrode region.

It should be noted that the pixel electrode does not herein always have a single electrode layer but may have a plurality of electrode layers, which are provided for each pixel and to which a display signal voltage is applied. That is to say, as in the dual-mode liquid crystal display device to be described later, the reflective electrode region may be made of a reflective electrode layer and the transmissive electrode region may be made of a transparent electrode layer. Alternatively, the reflective electrode region may be a combination of a transparent electrode and a reflective film. As another alternative, the pixel electrode may also be formed by providing a hole (i.e., a transmissive portion) for a single metal film, i.e., an electrode that is made of a semi-transmissive conductive film.

In this configuration, no electrode layer exists in the transmissive portion of the metal film. However, if the hole is sufficiently small, then an electric field that is applied from the metal film (i.e., electrode layer) surrounding the hole is intense enough. Then, the voltage to be applied to the liquid crystal layer is hardly affected by the hole of the metal film. Accordingly, the pixel electrode made of such a metal film is also herein regarded as having a reflective electrode region and a transmissive electrode region (corresponding to the hole).

Unlike a reflective liquid crystal display device, a liquid crystal display device including the transmissive electrode regions and the reflective electrode regions can advantageously display an image of quality even in an environment in which the ambient light is relatively dark. In addition, if its backlight is selectively turned ON or OFF according to the operating environment, the device can also conduct a display operation in the transmission mode.

Embodiment 1

Hereinafter, the pixel arrangement of a liquid crystal display device, which produces a hardly perceivable flicker even when driven at as low a frequency as 45 Hz or less, for example, and a method of driving such a device will be described.

First, the structure of a reflective liquid crystal display device 100 according to a first specific preferred embodiment of the present invention will be described with reference to FIG. 1. The reflective liquid crystal display device 100 includes a low frequency driver (not shown), a preferred embodiment of which will be described later.

As shown in FIG. 1, the reflective liquid crystal display device 100 includes reflective pixel electrodes 10 (which will be herein simply referred to as "reflective electrodes") that are arranged in columns and rows (i.e., in a matrix fashion), gate bus lines 32 extending in the row direction, source bus lines 34 extending in the column direction, and TFTs 20, each of which is provided for an associated one of the reflective electrodes 10. That is to say, each reflective electrode 10 is connected to one of the gate bus lines 32 and one of the source bus lines 34 by way of its associated TFT 20.

This liquid crystal display device 100 sequentially supplies a gate signal voltage to one of the gate bus lines 32 after another, thereby selecting one group of reflective electrodes 10, which are connected to the same gate bus line 32, after another. Then, the liquid crystal display device 100 supplies display signal voltages to the selected group of reflective electrodes 10 by way of the source bus lines 34, thereby displaying an image thereon. That is to say, this liquid crystal display device 100 is driven by a line sequential technique.

A period in which each of the gate bus lines is selected will be herein referred to as a "horizontal scanning period" and a period of time it takes to scan a predetermined number of gate bus lines over the entire display screen will be herein referred to as a "vertical scanning period". Where all of the gate bus lines are scanned on a frame-by-frame basis (i.e., when the refresh rate is 60 Hz), one frame period corresponds to one vertical scanning period. On the other hand, where one frame is divided into multiple fields so that the gate bus lines are scanned on a field-by-field basis, one field period that it takes to scan all of the gate bus lines belonging to one field corresponds to one vertical scanning period. In the liquid crystal display device according to this preferred embodiment of the present invention, the display signal voltage to be supplied to each of the pixel electrodes is updated at a frequency of 45 Hz or less. That is to say, the liquid crystal display device 100 is driven at a low frequency so that one vertical scanning period becomes 1/45 second or less.

Also, in each of the rows and in each of the columns, the pixel electrodes are arranged so that the polarity of the voltage to be applied to the liquid crystal layer is inverted for every predetermined number of pixel electrodes. That is to say, the liquid crystal display device is driven by a so-called "dot inversion technique". In the illustrative preferred embodiment to be described below, the liquid crystal display device is supposed to be driven by inverting the polarity for every pixel (i.e., the predetermined number of pixel electrodes is one). Alternatively, the polarity may also be inverted for every group of three consecutive pixels representing the three primary colors of red (R), green (G) and blue (B) (i.e., the predetermined number of pixel electrodes is three).

To drive the reflective liquid crystal display device 100 by the dot inversion technique, the reflective electrodes 10 are arranged in a hound's-tooth check pattern with respect to the TFTs 20 as shown in FIG. 1. That is to say, the TFTs 20 that are connected to each single gate bus line 32 include a first group of TFTs 20 that are connected to the reflective electrodes 10 belonging to one of the two adjacent rows (e.g., the upper row) and a second group of TFTs 20 that are connected to the reflective electrodes 10 belonging to the other adjacent row (e.g., the lower row). And the first and second groups of TFTs 20 are arranged along the gate bus line 32 such that every predetermined number of TFTs 20 of the first group are followed by every predetermined number of TFTs 20 of the second group.

In such an arrangement, if the polarity of the display signal voltages to be applied to all of the source bus lines 34 is inverted every time one gate bus line 32 is selected and if the polarity of the display signal voltages to be applied to the same reflective electrodes 10 in the next vertical scanning period is inverted, the liquid crystal display device 100 can be driven by the dot inversion technique. That is to say, by combining the hound's-tooth check arrangement of the TFTs 20 with the gate line inversion driving technique, the dot inversion drive is substantially realized. In this manner, the liquid crystal display device 100 of this preferred embodiment can be driven by the dot inversion technique by utilizing the conventional circuit configuration that is designed to realize gate line inversion drive.

For the sake of simplicity, it is herein supposed to be the "polarity of the display signal voltages to be applied to the source bus lines 34" that should be inverted. Strictly speaking, though, it is the "polarity of the voltage to be applied to the liquid crystal layer" to be driven by the "pixel electrodes 10 connected to the source bus lines 34" that is actually inverted. In other words, it is the "polarity of the potential at the pixel electrodes with respect to the potential at the counter electrode" that should be inverted. In the same way, the "display signal voltages to be applied to the pixel electrodes 10" will also be used as an equivalent to the "voltage to be applied to the liquid crystal layer".

The following Table 1 shows counter voltage shift values at which no flicker was perceivable to the human eyes for the liquid crystal display device 100 of the first preferred embodiment with the hound's-tooth check TFT arrangement and a liquid crystal display device with the conventional TFT arrangement that were displaying images in half tones:

TABLE 1

| Refresh Rate (Hz) | Vertical Scanning Period (msec) | Counter voltage Shift value (±mV or less) in conventional arrangement | Counter voltage Shift value (±mV or less) in hound's tooth arrangement |
|---|---|---|---|
| 70.0 | 14.3 | 256 | 527 |
| 17.5 | 57.1 | 85 | 123 |
| 10.0 | 100.0 | 66 | 111 |
| 6.4 | 157.1 | 37 | 144 |
| 5.0 | 200.0 | 28 | 146 |
| 3.7 | 271.4 | 30 | 169 |

where the pixel pitches were 60 μm×RGB×180 μm in both of these devices.

As shown in Table 1, even when the liquid crystal display device with the conventional arrangement was driven at a refresh rate of 70 Hz, a counter voltage shift of about 250 mV produced a perceivable flicker. Also, when the refresh rate was decreased to about 5 Hz, even a counter voltage shift of as small as about 30 mV made the line-by-line difference in brightness quite perceivable. What is worse, the refresh period (i.e., the vertical scanning period) was as long as about 200 ms in that case. As a result, the observer could clearly see with his or her own eyes how bright and dark lines were alternated every vertical scanning period.

In contrast, when the image on the liquid crystal display device 100 with the hound's-tooth arrangement was refreshed at a rate of 5 Hz, for example, a counter voltage shift of greater than 150 mV resulted in a perceivable flicker. Even so, that flicker did not form a striped pattern because the polarities of voltages being applied to vertically or horizontally adjacent pixels were different from each other. For that reason, the flicker was just felt like slight unevenness over the screen or periodic recurrence of barely perceivable difference in brightness. In this manner, when the refresh rate was decreased to as low as 5 Hz, the counter voltage shift value that might affect the display quality was approximately 150 mV, which does fall within an easily adjustable range even when the devices should be mass-produced. Thus, by adjusting the offset voltage, those defects can be substantially eliminated from the image displayed.

As described above, by combining the hound's-tooth check TFT arrangement with the gate line inversion driving technique, even a liquid crystal display device being driven at a low frequency can also display an image of quality with its power dissipation reduced and without allowing the observer to perceive any flicker.

Figure 2:
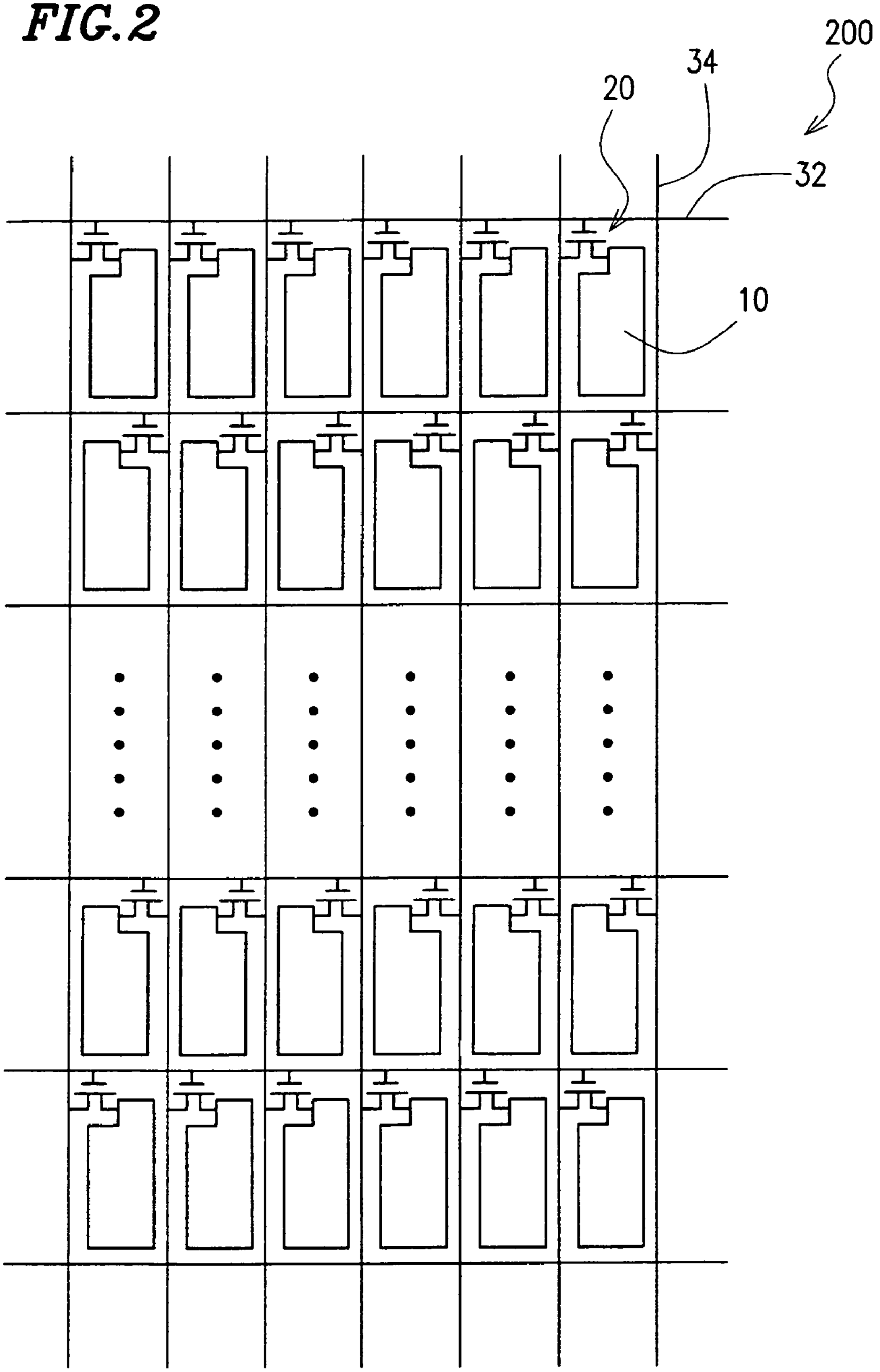
FIG. 2 is a plan view schematically illustrating a layout for another reflective liquid crystal display device 200 according to the first preferred embodiment.

The liquid crystal display device 100 of the preferred embodiment described above is driven by the gate line inversion technique with the TFTs 20 arranged in a hound's-tooth check pattern along the gate bus lines 32. Alternatively, even when driven by a source line inversion technique with the TFTs 20 arranged in a hound's-tooth check pattern along the source bus lines 34, the liquid crystal display device 200 can also be driven substantially by the dot inversion technique as shown in FIG. 2. Specifically, in the liquid crystal display device 200 shown in FIG. 2, the TFTs 20 that are connected to one source bus line 34 include a first group of TFTs 20 that are connected to the reflective electrodes 10 belonging to one of the two adjacent columns (e.g., the left-hand-side column) and a second group of TFTs 20 that are connected to the reflective electrodes 10 belonging to the other adjacent column (e.g., the right-hand-side column). And the first and second groups of TFTs 20 are arranged along the source bus line 34 such that every predetermined number of TFTs 20 of the first group are followed by every predetermined number of TFTs 20 of the second group.

In such an arrangement, if the polarity of the display signal voltage to be applied to one source bus line 34 is opposite to that of the display signal voltage to be applied to its adjacent source bus lines 34 in every vertical scanning period and if the polarities of the display signal voltages to be applied to the respective source bus lines 34 are inverted in the next vertical scanning period, the liquid crystal display device 200 can also be driven by the dot inversion technique. That is to say, by combining the hound's-tooth check arrangement of the TFTs 20 with the source line inversion driving technique, the dot inversion drive is substantially realized. In this manner, the liquid crystal display device 200 of this preferred embodiment can be driven by the dot inversion technique by utilizing the conventional circuit configuration that is designed to realize source line inversion driving.

It should be noted, however, that in the source line inversion driving technique, the counter electrode is driven with a direct current. Accordingly, the amplitude of the drive voltage to be applied to the liquid crystal layer should be defined by the amplitudes of the display signal voltages that are supplied from the source bus lines 34. Thus, compared to the gate line inversion driving technique in which the difference between the voltage applied to the counter electrode and the display signal voltages applied to the source bus lines 34 defines the amplitude of the drive voltage to be applied to the liquid crystal layer, the amplitude of the display signal voltages should be increased. That is to say, a driver circuit for the source driver should have a higher breakdown voltage, and the source line inversion driving technique dissipates greater power than the gate line inversion driving technique. For that reason, the gate line inversion driving technique is preferred to the source line inversion driving technique.

As described above, by combining the hound's-tooth check TFT arrangement with the gate or source line inversion driving technique, even a liquid crystal display device being driven at a low frequency can also display an image of quality without allowing the observer to perceive any flicker.

However, if the hound's-tooth check arrangement is formed with the positional relationship between each reflective electrode (or pixel electrode) 10 and its associated TFT 20 maintained as shown in FIG. 1 or 2, then two adjacent reflective electrodes 10 will face mutually different directions. For example, in the illustrative arrangement shown in FIG. 1, one of two horizontally adjacent reflective electrodes 10 is disposed by rotating the other to 180 degrees. On the other hand, in the illustrative arrangement shown in FIG. 2, one of two vertically adjacent reflective electrodes 10 is disposed by mirror-reflecting the other about the source bus line 34 as a reflection axis. Accordingly, unless the reflective electrodes 10 are arranged symmetrically via the 180 degree rotation or mirror reflection as shown in FIG. 1 or 2, the arrangement of the reflective electrodes 10 will be an irregular one as the TFTs 20 are arranged in the hound's-tooth check pattern. In that case, the irregular arrangement of the reflective electrodes 10 (or pixels) might be perceived as a zigzag line. Such a zigzag line is particularly noticeable when the refresh rate is 45 Hz or less.

To avoid such an unwanted situation, the reflective electrodes 10 having mutually congruent planar shapes should be arranged substantially straight both in the column and row directions. That is to say, all of the reflective electrodes 10 preferably have mutually congruent planar shapes and are preferably arranged so as to overlap with each other substantially entirely when translated either in the column direction or in the row direction. Also, even if the reflective electrodes 10 themselves are not arranged in a completely straight line, at least the geometric centers of mass of the reflective electrodes 10 should be arranged substantially in a straight line both in the column and row directions. Then, the zigzag line will be hardly perceivable.

In the liquid crystal display devices 100 and 200 shown in FIGS. 1 and 2, each of the reflective electrodes 10 has a partially notched rectangular planar shape so as not to cover its associated TFT 20. Alternatively, each reflective electrode 10 may also be a rectangular electrode that does cover its TFT 20. In that case, even if the liquid crystal display device 100 or 200 is driven at a low frequency of 45 Hz or less, the zigzag line will be invisible.

In the preferred embodiments described above, the present invention is applied to a reflective liquid crystal display device. However, the present invention is equally applicable to a semi-transmissive liquid crystal display device including semi-transmissive pixel electrodes 10, which are made of a semi-transmissive conductive film (e.g., an Al film having a number of pinholes), and similar effects are also achievable in that case.

Dual-Mode Liquid Crystal Display Device

Hereinafter, a preferred arrangement of pixel electrodes 10 to be combined with the hound's-tooth check TFT arrangement will be described for a reflective/transmissive liquid crystal display device (which will be herein referred to as a "dual-mode liquid crystal display device"). In the dual-mode liquid crystal display device to be described below, each pixel electrode includes a reflective electrode region and a transmissive electrode region. Also, each pixel includes: a reflective portion in which a display operation is conducted in a reflection mode by utilizing the light that has been reflected from the reflective electrode region; and a transmissive portion in which a display operation is conducted in a transmission mode by utilizing the light that has been transmitted through the transmissive electrode region. In a semi-transmissive liquid crystal display device of which the pixel electrodes are made of a metal film with pinholes, the light that has been transmitted through the pinholes and the light that has been reflected from the metal film are not perceived separately. In contrast, in the dual-mode liquid crystal display device, the light that has been transmitted through the transmissive portion and the light that has been reflected from the reflective portion are perceivable separately.

Figure 3A:
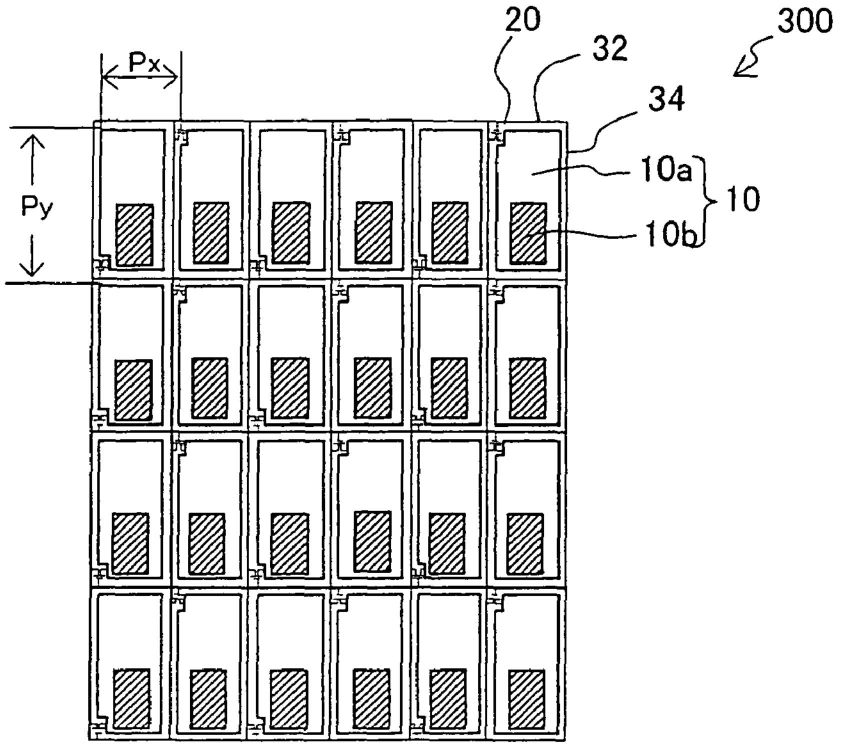
FIG. 3A is a plan view illustrating an exemplary arrangement of pixel electrodes in a dual-mode liquid crystal display device according to the first preferred embodiment.

FIG. 3A illustrates a dual-mode liquid crystal display device 300 according to a preferred embodiment of the present invention. In the liquid crystal display device 300, the TFTs 20 are arranged in the hound's-tooth check pattern with respect to the gate bus lines 32. Thus, just like the liquid crystal display device 100 shown in FIG. 1, dot inversion driving is substantially realized for the liquid crystal display device 300 by the gate line inversion driving technique. In the dual-mode liquid crystal display device 300, each pixel electrode 10 includes a reflective electrode region 10_a_ and a transmissive electrode region 10_b_. The transmissive electrode regions 10_b_ have mutually congruent planar shapes and are arranged so as to overlap with each other substantially entirely when translated in the row direction (at a pitch Px) or in the column direction (at a pitch Py). That is to say, the transmissive electrode regions 10_b_ are arranged in a straight line both in the column and row directions.

Figure 3B:
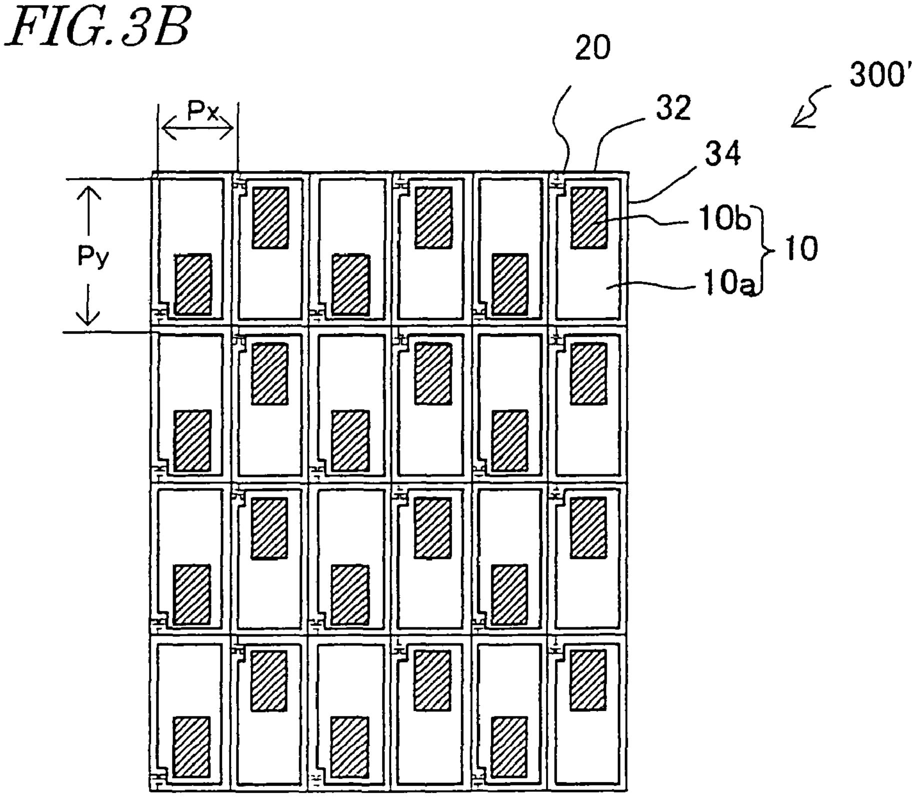
FIG. 3B is a plan view illustrating an exemplary arrangement of pixel electrodes in a dual-mode liquid crystal display device according to a comparative example.

FIG. 3B illustrates a liquid crystal display device 300' that is laid out by a conventional or normal design process so as to have a hound's-tooth check TFT arrangement. As shown in FIG. 3B, the positional relationship between each TFT 20 and its associated pixel electrode 10 is maintained. However, in the liquid crystal display device 300', the transmissive electrode regions 10_b_ are arranged irregularly in the row direction, and a shift between the centers of mass of two horizontally adjacent transmissive electrode regions 10_b_ is approximately Py/2, which is greater than the pitch Px in the row direction. Thus, while a display operation is conducted in the transmission mode, the irregular arrangement of the transmissive electrode regions 10_b_ is perceived as a zigzag line. Also, in the example illustrated in FIG. 3B, each pixel electrode 10 includes only one transmissive electrode region 10_b_ that is surrounded with the reflective electrode region 10_a_. Accordingly, the irregular shift of the geometric centers of mass of the transmissive electrode regions 10_b_ causes an irregular shift of the geometric centers of mass of the reflective electrode regions 10_a_. For that reason, even while a display operation is conducted in the reflection mode, a zigzag line is also perceivable.

In contrast, in the liquid crystal display device 300 shown in FIG. 3A, the transmissive electrode regions 10_b_ are arranged in a straight line in the row direction. Thus, even while a display operation is conducted in the transmission mode, no zigzag line is perceived. It should be noted that the transmissive electrode regions 10_b_ do not have to be arranged in a straight line as shown in FIG. 3A. This is because as long as the shift width of the centers of mass of the transmissive electrode regions 10_b_ as measured in the column direction is half or less of the pitch thereof in the row direction, the zigzag line is still hardly perceivable. Naturally, though, the transmissive electrode regions 10_b_ are preferably arranged so that the geometric centers of mass thereof are aligned, and more preferably, the transmissive electrode regions 10_b_ having mutually congruent planar shapes are arranged in a straight line as described above.

In a dual-mode liquid crystal display device (particularly in a liquid crystal display device in which only one transmissive electrode region 10_b_ is surrounded with the reflective electrode region 10_a_ in each pixel electrode 10), the arrangement of the transmissive electrode regions 10_b_ easily affects the quality of the image displayed. Thus, it is particularly preferable that the transmissive electrode regions 10_b_ satisfy the relationship described above. Naturally, the reflective electrode regions 10_a_ also preferably satisfy the relationship described above.

The phenomenon that the irregular arrangement of the transmissive electrode regions 10_b_ and/or the reflective electrode regions 10_a_ is perceived as a zigzag line is particularly noticeable when the liquid crystal display device is driven at as low a frequency as 45 Hz or less. However, even if the liquid crystal display device is driven at a frequency of 60 Hz or more, the quality of the image displayed is also degraded by the zigzag line. Accordingly, the effects described above are achievable not just for a liquid crystal display device that is driven at a low frequency but also for a dual-mode liquid crystal display device with a hound's-tooth check TFT arrangement as well. Also, as in the liquid crystal display device 100 described above, even if the liquid crystal display device 300 is driven at a low frequency, the device 300 still can display an image of quality almost without allowing the observer to perceive any flicker.

Figure 4:
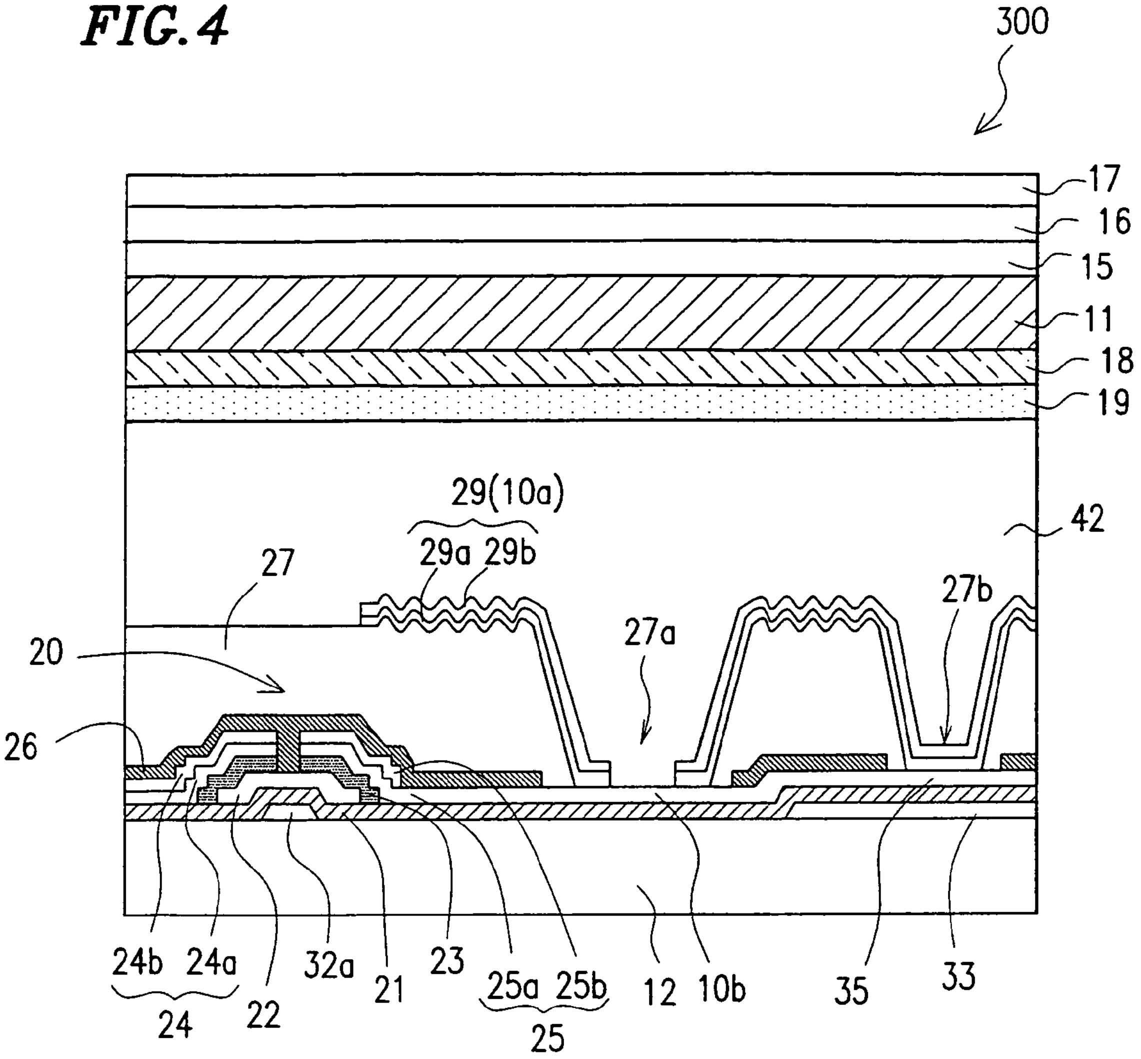
FIG. 4 is a cross-sectional view schematically illustrating a dual-mode liquid crystal display device 300 according to the first preferred embodiment.
Figure 5:
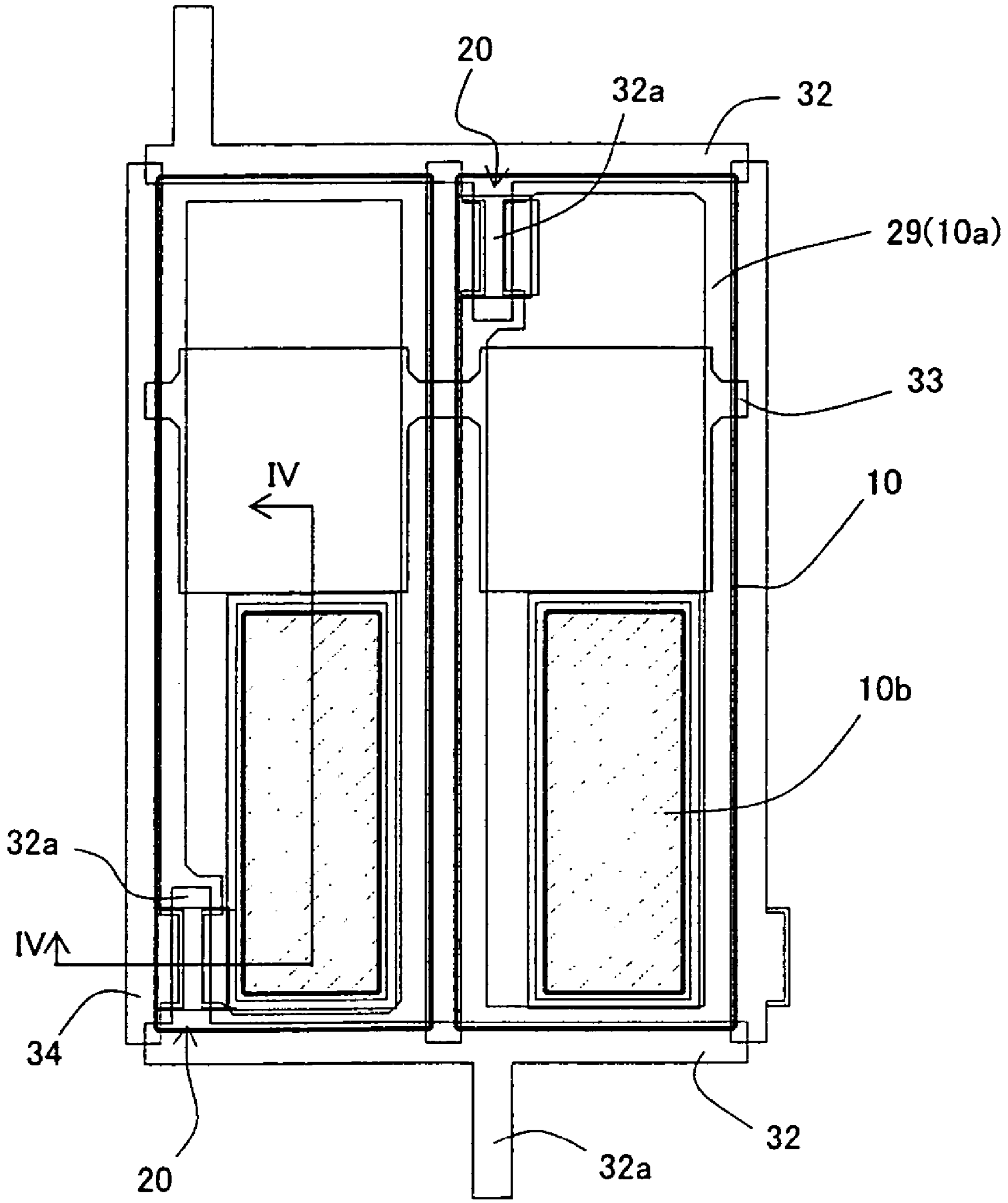
FIG. 5 is a plan view schematically illustrating the dual-mode liquid crystal display device 300 of the first preferred embodiment.

Next, the structure of the dual-mode liquid crystal display device 300 will be described in further detail with reference to FIGS. 4 and 5. FIG. 4 is a cross-sectional view schematically illustrating the dual-mode liquid crystal display device 300. FIG. 5 is a plan view thereof. The cross section illustrated in FIG. 4 is taken along the line IV-IV shown in FIG. 5.

As shown in FIG. 4, the liquid crystal display device 300 includes two insulating substrates (e.g., glass substrates) 11 and 12 and a liquid crystal layer 42 sandwiched between the substrates 11 and 12.

On one surface of the insulating substrate 11 that is opposed to the liquid crystal layer 42, a color filter layer 18 and a counter electrode (or common electrode) 19 are stacked in this order. On the upper surface of the insulating substrate 11, a phase plate 15, a polarizer 16 and an antireflective film 17 are formed in this order to control the incoming light. The antireflective film 17 may be omitted. Furthermore, on the innermost surface of the insulating substrate 11 that is closest to the liquid crystal layer 42, an alignment film (not shown) is provided. Although not shown specifically in FIG. 4, another phase plate, another polarizer and a backlight are provided on the outer surface of the insulating substrate 12.

On the surface of the insulating substrate 12 that is opposed to the liquid crystal layer 42, TFTs 20, gate bus lines 32, source bus lines 34 and pixel electrodes 10 are formed as shown in FIG. 5. Each of the pixel electrodes 10 is connected to one of the gate bus lines 32 and one of the source bus lines 34 by way of one of the TFTs 20. The pixel electrode 10 includes a reflective electrode region 10*a* and a transmissive electrode region 10*b*.

As shown in FIG. 4, each of the TFTs 20 includes: a gate electrode 32*a*, which is formed as a portion of the gate bus line 32; a gate insulating film 21, which is formed so as to cover the gate electrode 32*a*; a semiconductor layer (e.g., an amorphous silicon layer) 22, which is formed on the gate insulating film 21; and source/drain electrodes 24 and 25, which are formed over these members. A contact layer 23 is formed between the semiconductor layer 22 and the source/drain electrodes 24 and 25. The source electrode 24 has a two-layer structure consisting of an ITO layer 24*a* and a Ta layer 24*b*, which form integral parts of the source bus line 34. In the same way, the drain electrode 25 also has a two-layer structure consisting of an ITO layer 25*a* and a Ta layer 25*b*. An extended portion of the ITO layer 25*a* defines the transmissive electrode region 10*b* and a storage capacitor electrode 35.

Another insulating film (e.g., an SiN film) 26 and an interlevel dielectric film (e.g., photosensitive resin film) 27 are formed so as to cover the TFT 20. A finely embossed pattern is formed on a portion of the surface of the interlevel dielectric film 27. A reflective electrode 29 (corresponding to the reflective electrode region 10*a*) on the interlevel dielectric film 27 has a surface shape that reflects the unevenness on the surface of the interlevel dielectric film 27 and diffuses and reflects the incoming light adequately. This reflective electrode 29 has a two-layer structure in which an Al film 29*b* is deposited on a Mo film 29*a*. The reflective electrode 29 is electrically in contact with the ITO layer 25*a* at an opening 27*a* and a contact hole 27*b*, which are formed through the insulating film 26 and the interlevel dielectric film 27. A portion of the ITO layer 25*a* inside the opening 27*a*, in which no reflective electrode 29 exists, functions as the transmissive electrode region 10*b*.

As shown in FIG. 5, the TFTs 20 connected to an arbitrary one of the gate bus lines 32 include: a first group of TFTs 20 connected to the pixel electrodes 10 belonging to a row that is adjacent to, and located over, the gate bus line 32; and a second group of TFTs 20 connected to the pixel electrodes 10 belonging to a row that is adjacent to, and located under, the gate bus line 32. The first and second groups of TFTs 20 are alternately arranged along the gate bus line 32. Accordingly, the TFTs 20 and the pixel electrodes 10 are arranged such that a distance from a TFT 20 to the geometric center of mass of the transmissive electrode region 10*b* of its associated pixel electrode 10 is alternated with a different distance from an adjacent TFT 20 to the geometric center of mass of the transmissive electrode region 10*b* of its associated pixel electrode 10. In such a layout, the transmissive electrode regions 10*b* can be regularly arranged in the row direction so as to satisfy the conditions described above.

A display operation is conducted in the reflection mode in a portion of the liquid crystal layer 42 that is located between the reflective electrode 29 (i.e., the reflective electrode region 10*a*) and the counter electrode 19. On the other hand, a display operation is conducted in the transmission mode in another portion of the liquid crystal layer 42 that is located between the transmissive electrode region 10*b* and the counter electrode 19. That portion of the liquid crystal layer 42 corresponding to the transmissive portion (or transmissive region), in which the display operation is conducted in the transmission mode, is thicker than that portion of the liquid crystal layer 42 corresponding to the reflective portion (or reflective region), in which the display operation is conducted in the reflection mode. The difference in thickness between these two portions of the liquid crystal layer 42 is approximately equal to the thickness of the interlevel dielectric film 27. By utilizing such a structure, the display operation can be optimized both in the transmission and reflection modes. The portion of the liquid crystal layer 42 corresponding to the transmissive portion is preferably twice thicker than the portion of the liquid crystal layer 42 corresponding to the reflective portion.

The liquid crystal display device 30 includes: a liquid crystal capacitor $C_{LC}$ that is formed by the pixel electrodes 10, the counter electrode 19 and portions of the liquid crystal layer 42 located between these electrodes 10 and 19; and a storage capacitor $C_{CS}$, which is electrically connected in parallel to the liquid crystal capacitor $C_{LC}$. The storage capacitor $C_{CS}$ is formed by a storage capacitor line 33 (which is formed in the same process step with the gate bus line 32), the gate insulating film 21 and a portion of the ITO layer 25*a* (i.e., storage capacitor electrode 35). As shown in FIG. 4, that portion of the ITO layer 25*a* faces the storage capacitor line 33 with the gate insulating film 21 interposed between them. To prevent the pixel aperture ratio from decreasing substantially, the storage capacitor $C_{CS}$ is preferably formed below the reflective electrode 29.

In addition, by forming the storage capacitor, the counter voltage shift can be reduced and the flicker can be further decreased. To minimize the flicker by forming a storage capacitor with a great capacitance value, the storage capacitor $C_{CS}$ preferably has a relatively great capacitance value. In this preferred embodiment, to realize a voltage holding ratio (or retentivity) of 99% in a situation where the area of the reflective electrode region 10*a* accounts for 60% of each pixel electrode 10 and a refresh rate is 5 Hz, the storage capacitor $C_{CS}$ has a capacitance value of 0.96 pF. The ratio of this storage capacitance value $C_{CS}$ to the liquid crystal capacitance value $C_{LC}$ of 0.48 pF is 2.00. For the same reasons, the storage capacitor $C_{CS}$ is also preferably provided for the liquid crystal display device 100 or 200 described above.

Figure 6:
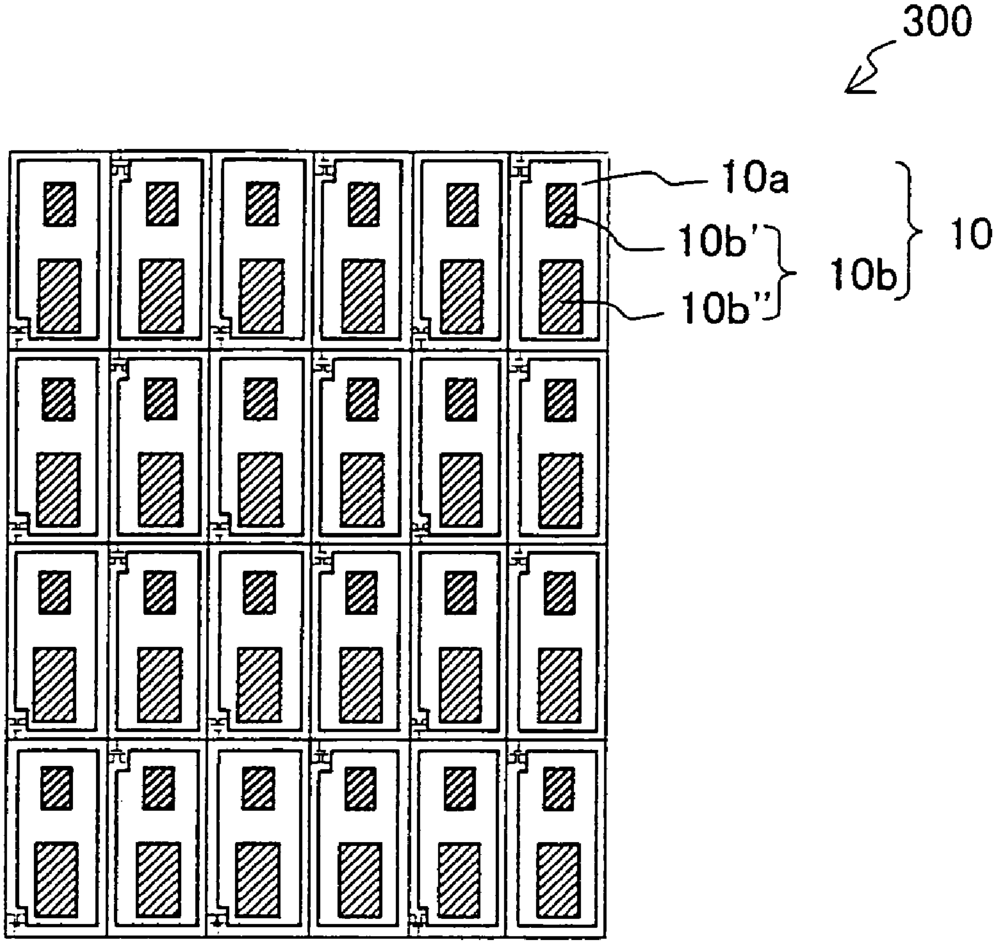
FIG. 6 is a plan view illustrating another exemplary arrangement of pixel electrodes in the dual-mode liquid crystal display device of the first preferred embodiment.

In the dual-mode liquid crystal display device 300 according to the preferred embodiment described above, the TFTs 20 are arranged in the hound's-tooth check pattern with respect to the gate bus lines 32. Alternatively, as in the liquid crystal display device 200 described above, the TFTs 20 may also be arranged in the hound's-tooth check pattern with respect to the source bus lines 34. Also, in a dual-mode liquid crystal display device in general, the pixel electrodes do not have to be arranged as in the preferred embodiment described above. For example, as shown in FIG. 6, the transmissive electrode region 10*b* of each pixel electrode 10 may be divided into two transmissive electrode regions 10b′ and 10b″. As another alternative, the transmissive electrode region 10b may also be divided into three or more. In any of those alternative preferred embodiments, however, the transmissive electrode regions 10b′, 10b″ and so on preferably satisfy the conditions described above as a whole. More preferably, the transmissive electrode regions 10b′, 10b″ and so on are arranged so that each of the transmissive electrode regions 10b′, 10b″ and so on satisfies the conditions described above.

Furthermore, in the dual-mode liquid crystal display device 300, the structures and materials of the respective members thereof are not limited to those exemplified above, but any known structure or material may be used instead. Furthermore, the switching element does not have to be the TFT 20 but may also be an FET or any other three-terminal element. Also, the dual-mode liquid crystal display device 300 may be fabricated by a known process (see Japanese Laid-Open Publication No. 2000-305110, for example).

Low-Frequency Driver

Hereinafter, a circuit to be preferably used to drive the liquid crystal display device at a low frequency will be described.

Figure 7:
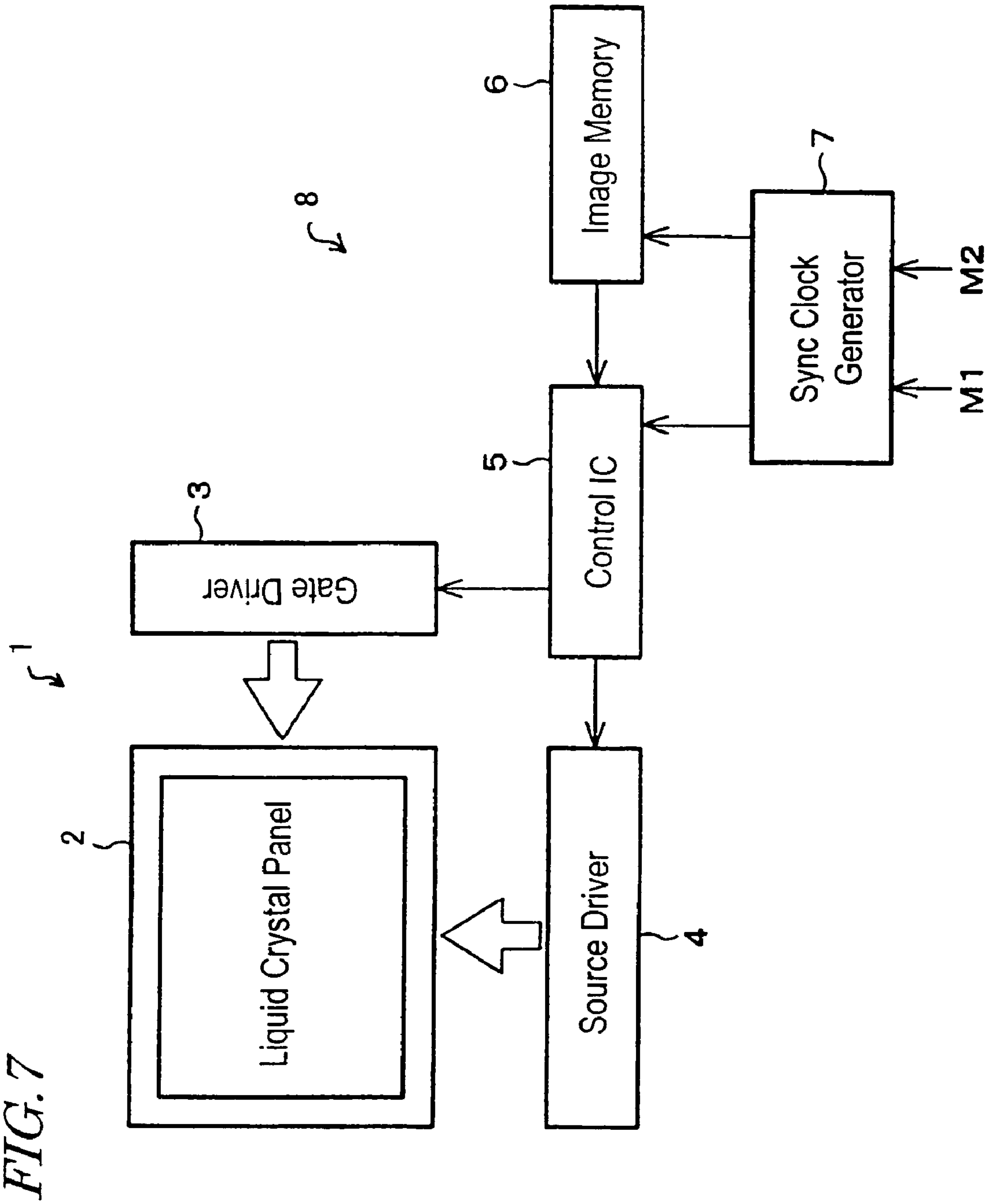
FIG. 7 is a block diagram showing a system configuration for a liquid crystal display device 1 according to the first preferred embodiment.

FIG. 7 is a block diagram illustrating an exemplary liquid crystal display device 1 according to the first preferred embodiment of the present invention. The liquid crystal display device 1 is a representative of the liquid crystal display devices 100, 200 and 300 described above.

As shown in FIG. 7, the liquid crystal display device 1 includes a liquid crystal panel 2 and a low-frequency driver 8. The liquid crystal panel 2 may have the configuration of the liquid crystal display device 100, 200 or 300 described above. The low-frequency driver 8 includes a gate driver 3, a source driver 4, a control IC 5, an image memory 6 and a sync clock generator 7.

The gate driver 3 is provided as a gate signal driver to output gate signals, having respective voltage levels representing selected and non-selected periods, to the gate bus lines 32 of the liquid crystal panel 2. The source driver 4 is provided as a data signal driver to supply image data to the respective pixel electrodes on the selected gate bus line 32 by way of the respective source bus lines 34 of the liquid crystal panel 2. The source driver 4 outputs the image data as display (or data) signals by an alternating current driving technique. The control IC 5 receives the image data, which is stored in the image memory 6 that is built in a computer, for example, and outputs a gate start pulse signal GSP and a gate clock signal GCK to the gate driver 3 and RGB gray-scale data, a source start pulse signal SP and a source clock signal SCK to the source driver 4, respectively.

The sync clock generator 7 is provided as a means for setting the frequency. Specifically, the clock generator 7 generates and outputs sync clock pulses to the control IC 5 and the image memory 6 to make the control IC 5 read the image data from the image memory 6 and output the gate start pulse signal GSP, gate clock signal GCK, source start pulse signal SP and source clock signal SCK in response to the clock pulses. In this preferred embodiment, the sync clock generator 7 sets the frequency of the sync clock pulses so that the frequencies of the respective signals are equalized with the refresh frequency of the image on the liquid crystal panel 2. The frequency of the gate start pulse signal GSP is equal to the refresh frequency. The sync clock generator 7 can set at least one refresh rate equal to 30 Hz or less and can also define multiple refresh rates including 30 Hz.

In the preferred embodiment illustrated in FIG. 7, the sync clock generator 7 changes the refresh rates responsive to externally input frequency setting signals M1 and M2. Any number of frequency setting signals may be used. For example, supposing there are two frequency setting signals M1 and M2 as in the preferred embodiment illustrated in FIG. 7, the sync clock generator 7 can set four refresh rates as shown in the following Table 2:

TABLE 2

| M1 | M2 | Frequency (Hz) |
|---|---|---|
| H | H | 60 |
| H | L | 30 |
| L | H | 15 |
| L | L | 6 |

The refresh rates may be set by inputting multiple frequency setting signals to the sync clock generator 7 as in the preferred embodiment shown in FIG. 7. Alternatively, the sync clock generator 7 may include a volume for adjusting the refresh rate or a switch for selecting a refresh rate. It is naturally possible to provide such a refresh rate adjusting volume or selecting switch on the outer casing surface of the liquid crystal display device 1 for the special convenience of users. In any case, the sync clock generator 7 may have any configuration as long as the clock generator 7 can change the refresh rate settings in accordance with external instructions. Optionally, the sync clock generator 7 may also be so constructed as to change the refresh rates automatically with the type of image to be displayed.

In response to the gate start pulse signal GSP supplied from the control IC 5, the gate driver 3 starts scanning the liquid crystal panel 2. On the other hand, responsive to the gate clock signal GCK, the gate driver 3 sequentially supplies a select voltage to one of the gate bus lines 32 after another. In response to the first pulse of the source start pulse signal SP supplied from the control IC 5, the source driver 4 stores the gray-scale data of the respective pixels on registers synchronously with the source clock signal SCK. On the next pulse of the source start pulse signal SP, the source driver 4 writes the gray-scale data on the respective source bus lines 34 of the liquid crystal panel 2.

Figure 8A:
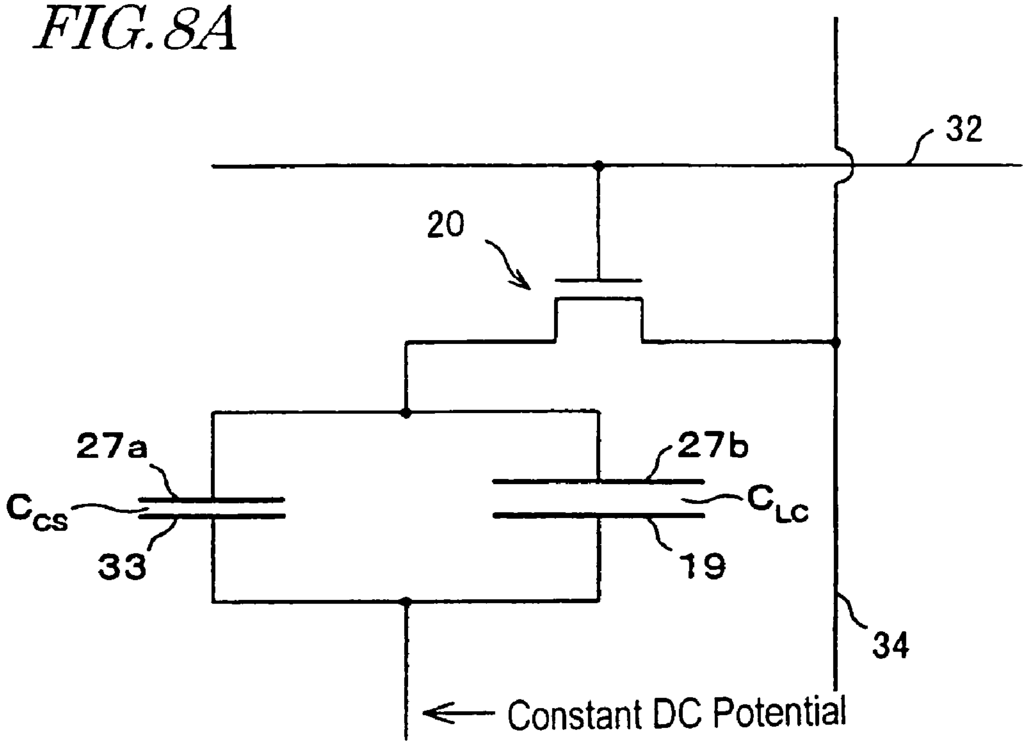
FIGS. 8A and 8B each show an equivalent circuit of one pixel of a liquid crystal panel that includes a storage capacitor $C_{CS}$.
Figure 8B:
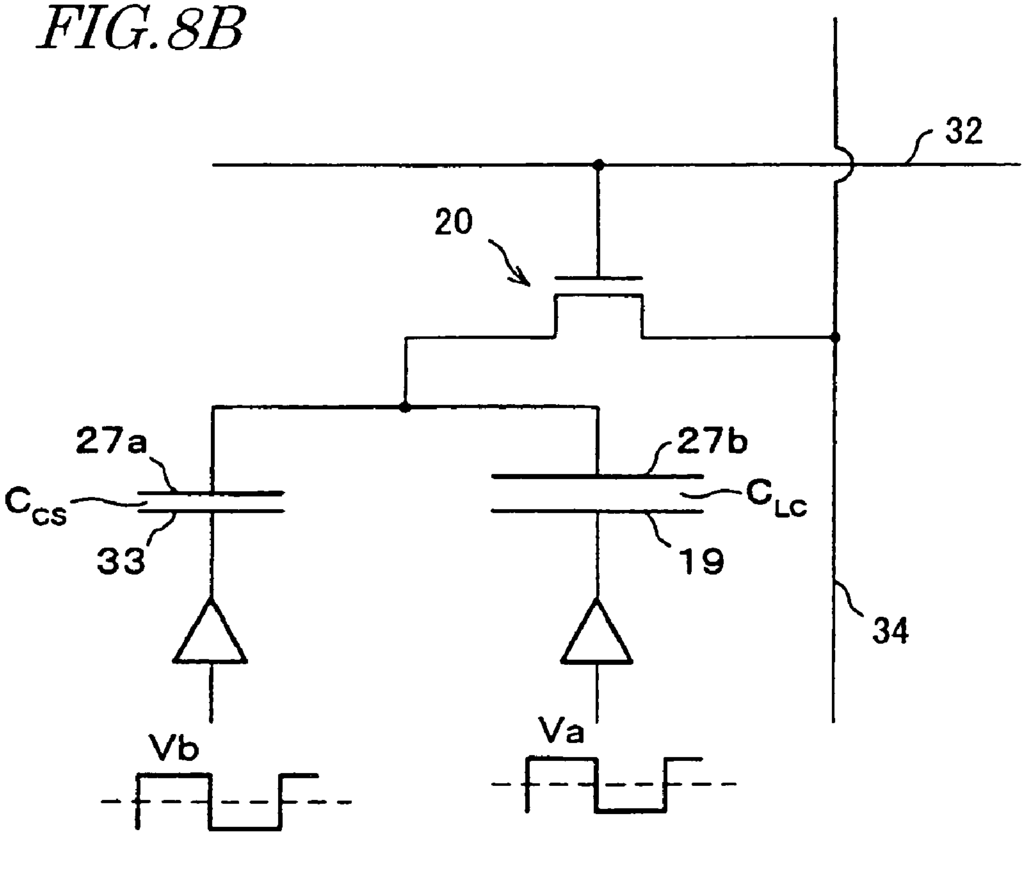

FIGS. 8A and 8B each illustrate an equivalent circuit of one pixel of the liquid crystal panel 2 that includes the storage capacitor $C_{CS}$ (e.g., the liquid crystal panel of the liquid crystal display device 300). In the equivalent circuit shown in FIG. 8A, the liquid crystal capacitor $C_{LC}$, which is formed by sandwiching the liquid crystal layer 42 between the counter electrode 19 and the pixel electrode 10, and the storage capacitor $C_{CS}$, which is formed by sandwiching the gate insulating film 21 between the storage capacitor electrode pad 35 and the storage capacitor line 33, are connected in parallel to the TFT 20 and a constant DC potential is applied to the counter electrode 19 and the storage capacitor line 33. In the equivalent circuit shown in FIG. 8B on the other hand, an AC voltage Va is applied to the counter electrode 19 of the liquid crystal capacitor $C_{LC}$ by way of a buffer and another AC voltage Vb is applied to the storage capacitor line 33 of the storage capacitor $C_{CS}$ by way of another buffer. The AC voltages Va and Vb have the same amplitude and are in phase with each other. Accordingly, in this case, the potentials at the counter electrode 19 and the storage capacitor line 33 oscillate in phase with each other. Also, even in the circuit shown in FIG. 8A in which the liquid crystal capacitor $C_{LC}$ and the storage capacitor $C_{CS}$ are connected in parallel with each other, a common AC voltage may be applied via a buffer instead of the constant DC potential.

In each of these equivalent circuits, a select voltage is applied to the gate bus line 32 to turn the TFT 20 ON and a display signal is supplied to the liquid crystal capacitor $C_{LC}$ and the storage capacitor $C_{CS}$ by way of the source bus line 34. Next, a non-select voltage is applied to the gate bus line 32 to turn the TFT 20 OFF. As a result, the pixel holds the charges that have been stored in the liquid crystal capacitor $C_{LC}$ and the storage capacitor $C_{CS}$. In this preferred embodiment, the storage capacitor line 33 that forms the storage capacitor $C_{CS}$ of the pixel is disposed at such a position as not to form a coupling capacitor with the gate bus line 32 (see FIG. 5, for example). Thus, the equivalent circuit shown in FIG. 8A or 8B neglects this coupling capacitor. If the sync clock generator 7 changes the refresh rates in such a state so that the charge stored in the liquid crystal capacitor $C_{LC}$ (i.e., the image displayed on the liquid crystal panel 2) is renewed at a rate of 45 Hz or less, then the variation in potential at the pixel electrode 10 (i.e., the electrode of the liquid crystal capacitor $C_{LC}$) can be minimized even when the potential level on the gate bus line 32 changes significantly. This is contrary to the situation where the storage capacitor $C_{CS}$ is formed by an on-gate structure.

The liquid crystal display device 1 is preferably driven at a low frequency of 45 Hz or less. This is because even though the frequency of the gate signal decreases, the power dissipation of the gate signal driver can be reduced sufficiently, the polarity of the display signal inverts at a lower frequency, and the power dissipation of the data signal driver (or the source driver 4 in the example illustrated in FIG. 7) can be reduced sufficiently. Also, since the variation in potential at the pixel electrode 10 is minimized, an image of quality can be displayed constantly without allowing the observer to perceive any flicker.

Figure 9:
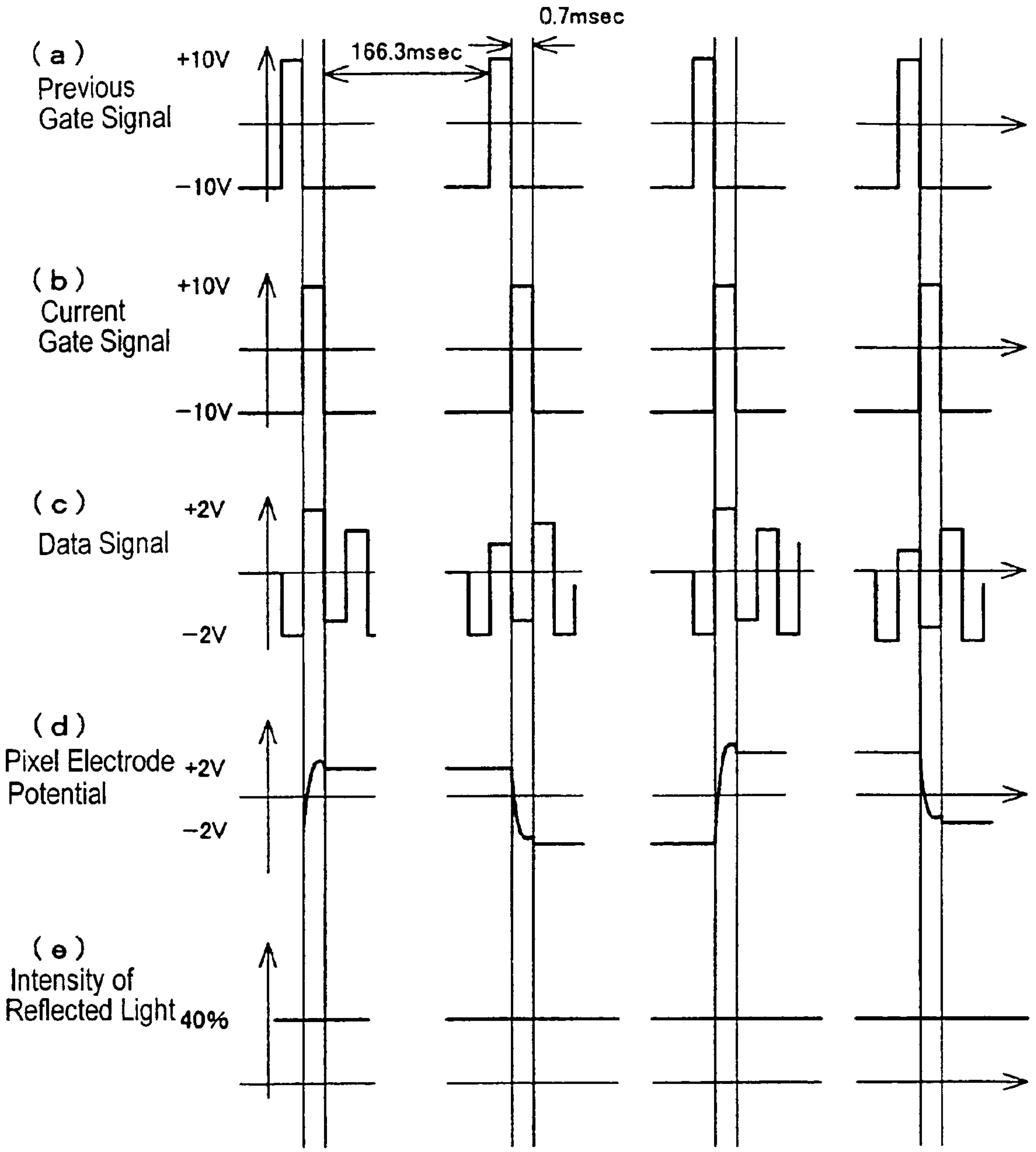
FIG. 9 shows patterns (a), (b), (c), (d) and (e), which show the waveform of a gate signal, the waveform of another gate signal, the waveform of a data signal, the potential level at a pixel electrode and the intensity of reflected light, respectively, in a situation where the liquid crystal display device of the first preferred embodiment is driven at a low frequency.

Patterns (a), (b), (c), (d) and (e) in FIG. 9 show the waveform of a gate signal, the waveform of another gate signal, the waveform of the data signal (or display signal), the potential at the pixel electrode 10, and the intensity of the light reflected from the reflective electrode 29, respectively, in a situation where the liquid crystal display device 1 is driven at a low frequency. In this case, the image was refreshed at a rate of 6 Hz, which is one-tenth of 60 Hz. More specifically, each refresh period of 167 msec, corresponding to the refresh rate of 6 Hz, consisted of a selected period of 0.7 msec in which each gate bus line 32 was selected and a non-selected period of 166.3 msec in which the gate bus line 32 was not selected. The liquid crystal display device 1 was driven in such a manner that the polarity of the data signal to be supplied to each source bus line 34 was inverted responsive to each pulse of the gate signal and that a data signal having a polarity opposite to the previous one was input to each pixel every time the image was refreshed.

Pattern (a) in FIG. 9 shows the waveform of a gate signal that is output onto the gate bus line 32 to be scanned just before the gate bus line 32 including a target pixel is scanned. For convenience sake, the former gate bus line 32 will be herein referred to as "the previous gate bus line 32" while the latter gate bus line 32 will be herein referred to as "the current gate bus line 32". Pattern (b) in FIG. 9 shows the waveform of a gate signal that is output onto the current gate bus line 32 including the target pixel (i.e., at the self-stage). Pattern (c) in FIG. 9 shows the waveform of a data signal that is output onto the source bus line 34 including the target pixel. And pattern (d) in FIG. 9 shows the potential level at the pixel electrode 10 of the target pixel. As can be seen from patterns (a) and (d) in FIG. 9, while a select voltage is being applied to the previous gate bus line 32, the potential level at the pixel electrode 10 is constant. During this selected period, the intensity of the light that was reflected from the reflective electrode 29 showed almost no detectable variation as shown by pattern (e) in FIG. 9. It was also confirmed with the eyes that an image of uniform and good quality could be displayed on the screen without allowing the observer to perceive any flicker. Similar results were also obtained when an image was displayed in the transmission mode by using the transmissive electrode regions 10*b* of the pixel electrodes 10.

The power dissipation of the liquid crystal display device 1 was also measured. Specifically, when the liquid crystal display device 1 was driven at a refresh period of 16.7 msec (i.e., at a refresh rate of 60 Hz), the device 1 dissipated a power of 160 mW. On the other hand, when the liquid crystal display device 1 was driven at a refresh period of 167 msec (i.e., at a refresh rate of 6 Hz), the device 1 dissipated a power of just 40 mW. Thus, it was confirmed that the power dissipation could be reduced significantly.

In the example illustrated in FIG. 9, the refresh rate is supposed to be 6 Hz. However, the refresh rate may be any other value that falls within a preferable range of 0.5 Hz to 45 Hz.

Figure 10A:
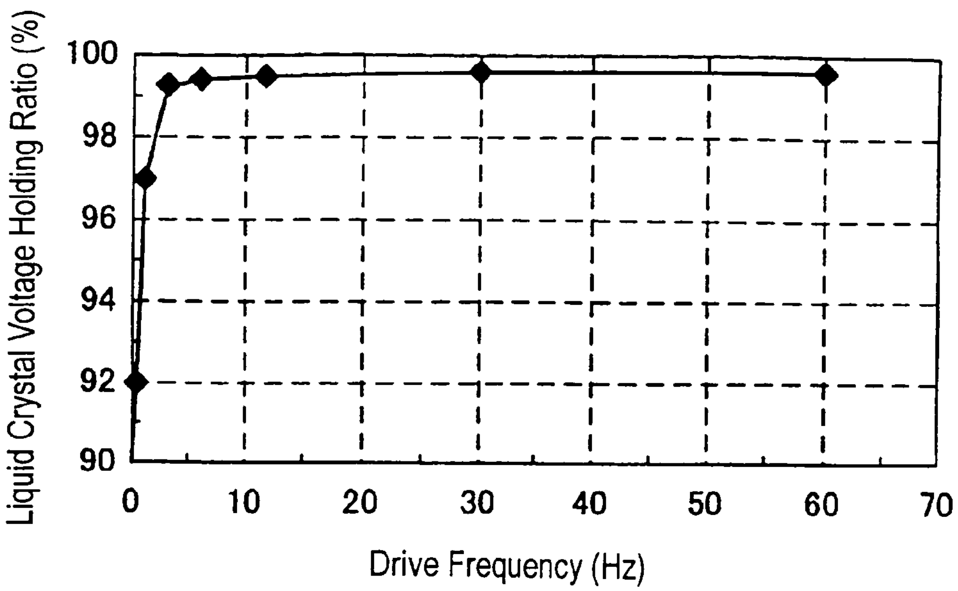
FIGS. 10A and 10B are graphs showing the dependence of the liquid crystal voltage holding ratio Hr on the drive frequency (or refresh rate).
Figure 10B:
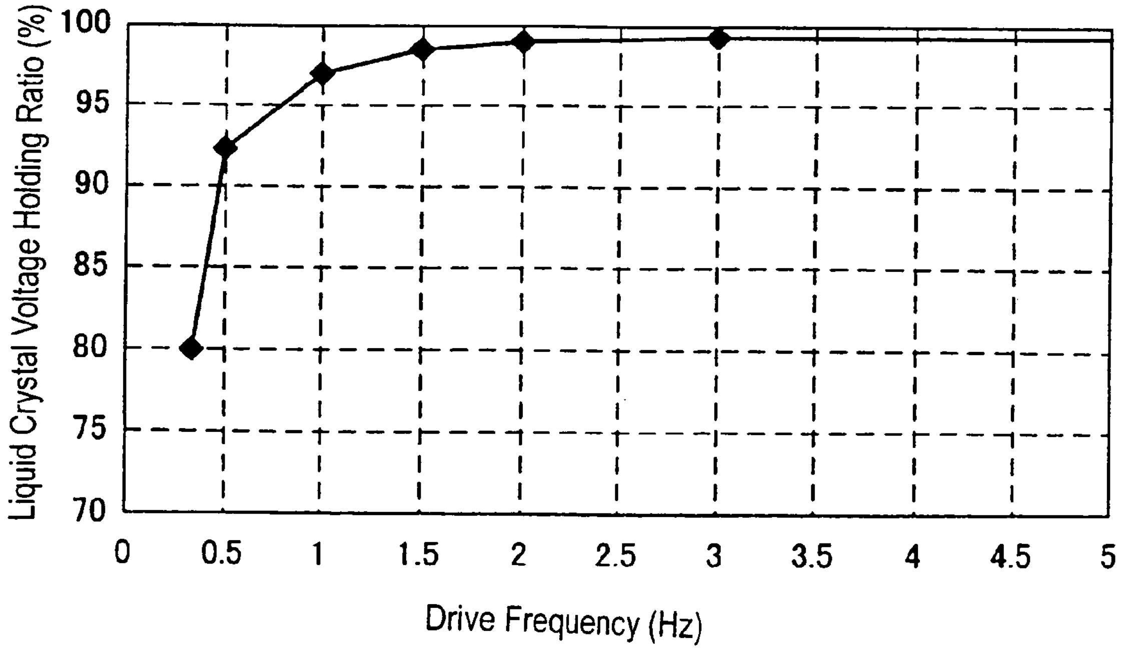

The reasons will be described with reference to FIGS. 10A and 10B. FIGS. 10A and 10B show how the voltage holding ratio Hr of the liquid crystal material (e.g., ZLI-4792 produced by Merck & Co., Ltd.) of the liquid crystal layer 42 changed with the drive frequency (or refresh rate) when the write time was fixed at 100 μsec, for example. FIG. 10B shows a portion of FIG. 10A in which the drive frequency is 0 Hz to 5 Hz to a larger scale.

As can be seen from FIG. 10B, when the drive frequency is 1 Hz, the liquid crystal voltage holding ratio Hr is still as high as about 97%. However, if the drive frequency is decreased to less than 1 Hz, the voltage holding ratio Hr starts to decrease significantly. And if the drive frequency is lower than 0.5 Hz (at which the holding ratio Hr is about 92%), the holding ratio Hr decreases steeply. If the liquid crystal voltage holding ratio Hr is too low, then a non-negligible amount of leakage current flows from the liquid crystal layer 42 or the TFTs 20, thereby changing the potential level at the pixel electrodes 10 greatly. Then, the brightness also changes noticeably to produce a perceivable flicker. Also, in just a short period of time (on the order of 1 to 2 seconds) after the write operation has been performed, the off-state resistance of the TFTs 20 normally does not change significantly as is supposed otherwise in the present discussion. Accordingly, it heavily depends on the liquid crystal voltage holding ratio Hr whether the image displayed flickers or not.

For these reasons, to reduce the variation in potential level at the pixel electrodes 10 sufficiently, the refresh rate is preferably 0.5 Hz or more but 45 Hz or less. Then, the power dissipation of the liquid crystal display device 1 can be reduced sufficiently and the unwanted flicker can be eliminated as well. More preferably, the refresh rate is 1 Hz or more but 15 Hz or less. Then, the power dissipation can be further reduced and yet the variation in potential level at the pixel electrodes 10 can be minimized. As a result, the power dissipation can be cut down drastically and the flicker can be eliminated even more perfectly.

Also, the sync clock generator 7 can set multiple refresh rates as described above. Accordingly, these refresh rates may be selectively used depending on the intended application (or the specific type of the image to be displayed). For example, in displaying a still picture or a picture with little motion, the refresh rate may be set to 45 Hz or less to cut down the power dissipation. On the other hand, in displaying a motion picture, the refresh rate may be set to more than 45 Hz to present the images smooth enough. Those refresh rates may include 15 Hz, 30 Hz, 45 Hz and 60 Hz so that each refresh rate is a multiple of the lowest refresh rate. In that case, a common reference sync signal is applied to every refresh rate. In addition, when the refresh rates are switched, the display signal to be supplied can be either decimated or added easily. Furthermore, each refresh rate is preferably obtained by multiplying the lowest refresh rate by an $n^{th}$ power (where n is an integer) of two. For example, the refresh rates may include 15 Hz, 30 Hz (i.e., twice as high as 15 Hz) and 60 Hz (i.e., four times as high as 15 Hz). Then, each refresh rate may be generated by using a normal simple frequency divider, which performs frequency conversion by dividing a logical signal representing the lowest frequency by the inverse number of an $n^{th}$ power of two.

A reference refresh rate is also set for the liquid crystal display device 1 to define the refresh rate at which the image displayed on the liquid crystal panel 2 is updated into a different image (i.e., a rate at which a display signal is supplied to provide different image data for the respective pixels and update the image on the screen). If the relationship between the refresh rate and the reference refresh rate is defined in the following manner, then the performance of the liquid crystal panel 2 is improved.

For example, the lowest one of the multiple refresh rates may be obtained by multiplying the reference refresh rate by an integer that is equal to or greater than two. If the refresh rate is defined in this manner, each of the pixels is selected at least twice or a greater number of times with respect to the same image that is displayed on the screen between the previous and the next updates. For example, supposing the reference refresh rate is 3 Hz, the refresh rate of 6 Hz in the example illustrated in FIG. 9 is twice as high as the reference refresh rate. Accordingly, in the interval between the previous and next updates, a positive display signal and a negative display signal can be supplied once apiece to the same pixel. Thus, the same image can be displayed with the polarity of the potential at the pixel electrode 10 inverted by an alternating current driving technique. As a result, the reliability of the liquid crystal material for the liquid crystal panel 2 can be increased.

Furthermore, even when the reference refresh rates are changed, the sync clock generator 7 may be so constructed as to change at least the lowest refresh rate into a rate that is obtained by multiplying the new reference refresh rate by two or a greater integer. In that case, even after the reference refresh rates have been changed, the same image can be displayed on the liquid crystal panel 2 at the new refresh rate with the polarity of the potential at the pixel electrode 10 inverted by an alternating current driving technique. As a result, the reliability of the liquid crystal material for use in the liquid crystal panel 2 can be easily maintained. For example, if the reference refresh rate is changed from 3 Hz into 4 Hz, then the sync clock generator 7 can change the refresh rates of 6 Hz, 15 Hz, 30 Hz and 45 Hz into new refresh rates of 8 Hz, 20 Hz, 40 Hz and 60 Hz. Also, if the lowest refresh rate is set to an integer of 2 or more (e.g., 6 Hz) with the above-described conditions satisfied, then the reference refresh rate will be at least 1 Hz. That is to say, the image on the screen can be updated at least once a second. Thus, when a clock is displayed on the screen of the liquid crystal panel 2, the clock can keep time accurately enough on a second basis.

As described above, the liquid crystal display device 1 of the first preferred embodiment can reduce the power dissipation significantly and yet can display an image of quality by using switching elements. Also, the liquid crystal display device 1 may conduct a display operation in the reflection mode and can be driven at a frequency of 45 Hz or less with the power dissipation cut down by a far higher percentage than the conventional one.

It should be noted that a low-frequency driver for use in a liquid crystal display device according to a preferred embodiment of the present invention does not have to have the circuit configuration described above. For example, the low-frequency driver may include a frame memory for its controller or source driver to decrease the clock rate.

As described above, according to the first preferred embodiment of the present invention, even when driven at a low frequency of 45 Hz or less, the liquid crystal display device still can display an image of quality with the power dissipation reduced significantly and without allowing the observer to perceive any flicker. Also, the dual-mode liquid crystal display device according to the first preferred embodiment includes switching elements that are arranged in a hound's-tooth check pattern but still can display an image of quality without allowing the observer to perceive at least the zigzag line that is often formed by the transmissive electrode regions.

Embodiment 2

Hereinafter, a liquid crystal display device according to a second specific preferred embodiment of the present invention will be described. The liquid crystal display device of the second preferred embodiment is a dual-mode liquid crystal display device in which an electrode potential difference created between the electrodes of a reflective portion is approximately equal to an electrode potential difference created between the electrodes of a transmissive portion. As used herein, the "electrode potential difference created between the electrodes" means a DC voltage that is applied to the liquid crystal layer when no voltage is externally applied for display purposes. In the dual-mode liquid crystal display device of the second preferred embodiment, the electrode potential difference created between the electrodes of a reflective portion is approximately equal to the electrode potential difference created between the electrodes of a transmissive portion. Thus, the flicker, which is often produced in a conventional dual-mode liquid crystal display device due to the difference in electrode potential difference between its reflective and transmissive portions, can be minimized.

First, it will be described with reference to FIGS. 14 and 15 how a flicker is produced in a known dual-mode liquid crystal display device due to the difference in electrode potential difference between its reflective and transmissive portions.

Figure 14:
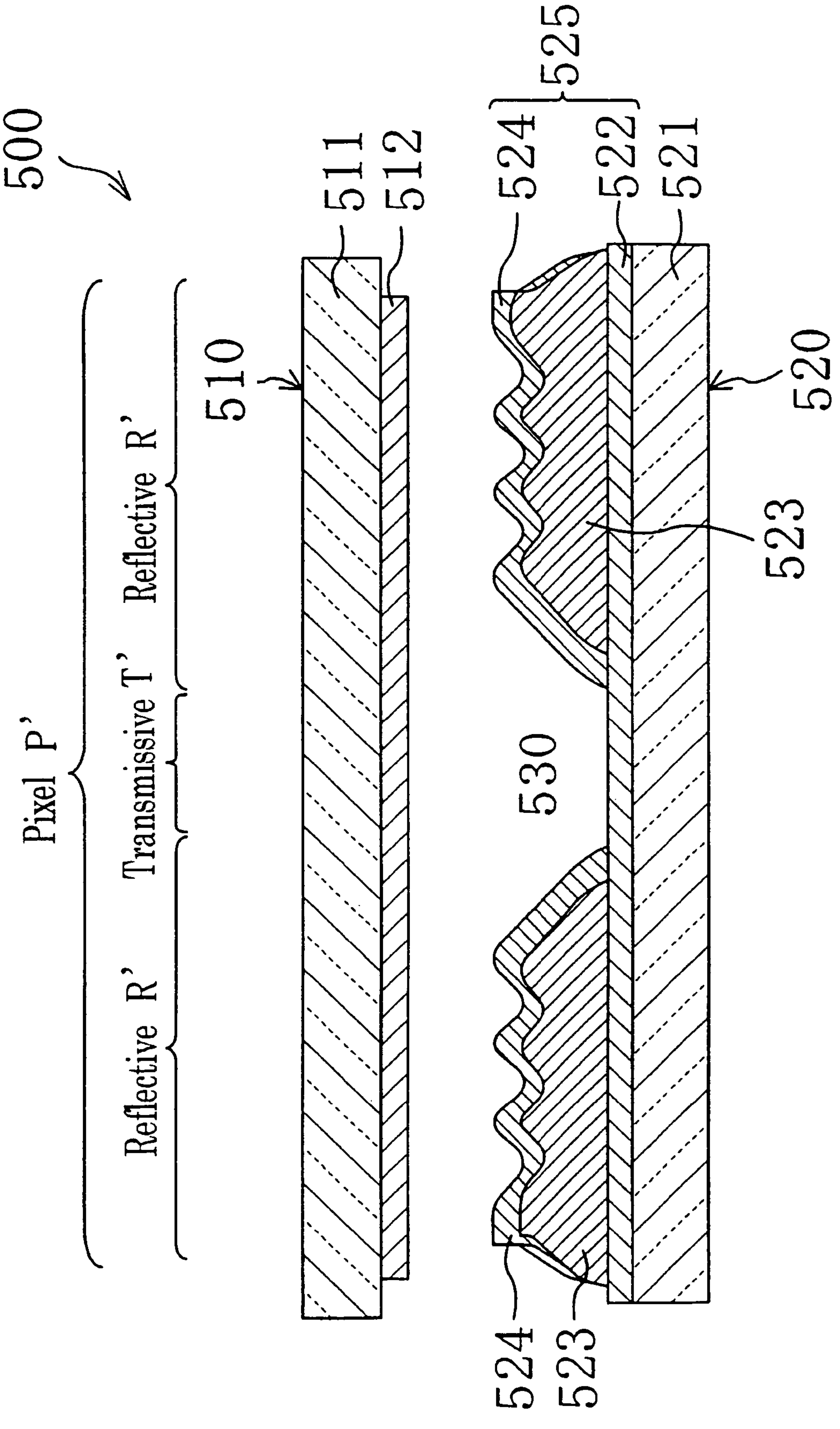
FIG. 14 is a cross-sectional view illustrating the structure of one pixel of a conventional dual-mode liquid crystal display device.
Figure 15:
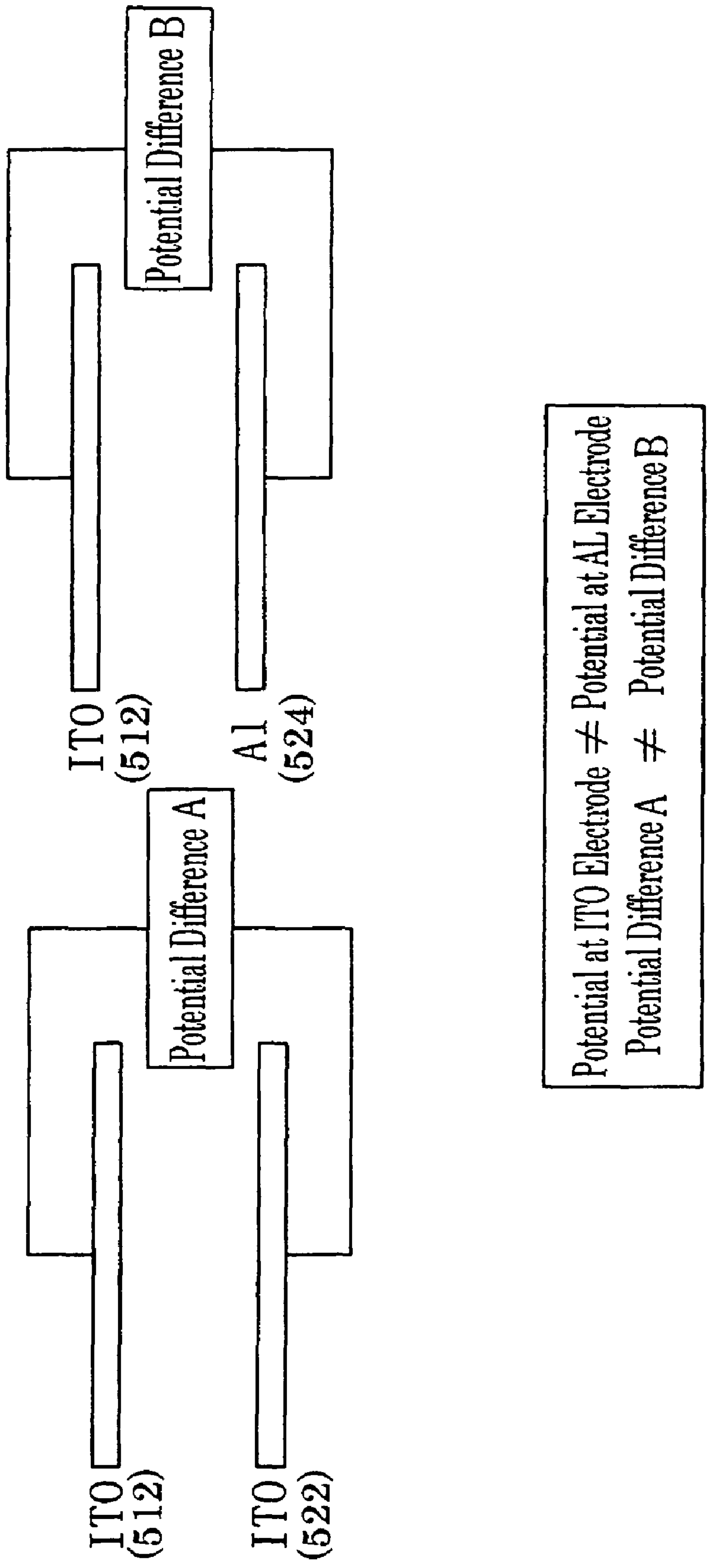
FIG. 15 shows an electrode potential difference created between the electrodes of a transmissive portion and an electrode potential difference created between the electrodes of a reflective portion.

The dual-mode liquid crystal display device 500 shown in FIG. 14 includes a counter substrate 510, an active matrix substrate 520 and a liquid crystal layer 530 that is sandwiched between the substrates 510 and 520. The counter substrate 510 includes a transparent common electrode 512, which is made of an oxide of columnar crystals that is mainly composed of indium oxide and tin oxide (which is normally called "ITO"). A number of pixel electrodes 525, each defining a pixel P', are arranged in columns and rows (i.e., in matrix) on the active-matrix substrate 520. Each of the pixel electrodes 525 includes a reflective electrode (or reflective electrode region) 524 that defines the reflective portion R' of the pixel P' and a transparent electrode (or transmissive electrode region) 522 that defines the transmissive portion T' of the pixel P'. The reflective electrode 524 is made of an Al layer while the transparent electrode 522 is made of an ITO layer. That is to say, a portion of the liquid crystal layer 530 corresponding to the reflective portion R' is sandwiched between the Al and ITO layers. On the other hand, a portion of the liquid crystal layer 530 corresponding to the transmissive portion T' is sandwiched between the two ITO layers. In the reflective portion R', a voltage is applied to that portion of the liquid crystal layer 530 between the transparent common electrode 512 on the counter substrate 510 and the reflective electrode 524 on the active-matrix substrate 520. In this reflective portion R', externally incoming light is transmitted through the counter substrate 510, is reflected from the reflective electrode 524 on the active-matrix substrate 520 and then goes out through the counter substrate 510, thereby displaying an image in the reflection mode. In the transmissive portion T' on the other hand, a voltage is applied to that portion of the liquid crystal layer 530 between the transparent common electrode 512 on the counter substrate 510 and the transparent electrode 522 on the active matrix substrate 520. In this transmissive portion T', additional light, which has been emitted from a backlight disposed behind the liquid crystal panel, passes through the active matrix substrate 520 and then goes out through the counter substrate 510, thereby displaying an image in the transmission mode. The reflective electrode 524 is formed so as to cover an interlevel dielectric film 523 that has a finely embossed pattern on the surface thereof. Thus, the reflective electrode 524 also has a finely embossed surface that controls the direction in which the reflected light goes. That is to say, the reflective electrode 524 reflects the incoming light with appropriate directivity.

In the pixel electrode 525 of this dual-mode liquid crystal display device 500, the reflective electrode 524 defining the reflective portion R' and the transparent electrode 522 defining the transmissive portion T' are made of different electrode materials (i.e., two materials with mutually different work functions) as described above. Thus, as shown in FIG. 15, the electrode potential difference A created between the electrodes 512 and 522 of the transmissive portion T' is different from the electrode potential difference B created between the electrodes 512 and 524 of the reflective portion R'. That is to say, while no external voltage is applied for display purposes, a DC voltage applied to a portion of the liquid crystal layer 530 corresponding to the transmissive portion T' is different from that applied to another portion of the liquid crystal layer 530 corresponding to the reflective portion R'.

Accordingly, even if the same voltage is applied to each pair of electrodes 512 and 522 or 512 and 524, the voltage applied to that portion of the liquid crystal layer 530 corresponding to the transmissive portion T' of the pixel P' should be different from the voltage applied to that portion of the liquid crystal layer 530 corresponding to the reflective portion R' of the pixel P'. In other words, the voltages applied are not uniform in a single pixel P'. That is to say, even if an offset voltage is defined for the transmissive portion T' so as to compensate for the feedthrough voltage and the electrode potential difference A, a flicker still may be observed because the reflective portion R' may have a counter voltage shift due to the difference between the electrode potential differences A and B.

It should be noted that the electrode potential difference B created in the reflective portion R' is changeable significantly with the potential levels at the electrodes that face each other via the liquid crystal layer and that are made of mutually different materials with two different work functions. However, even if these two electrodes are made of the same material, an electrode potential difference still may be created between them because the material of an alignment film on one of the two electrodes may be different from that of an alignment film on the other electrode. Accordingly, the electrode potential difference A created in the transmissive portion T', in which the liquid crystal layer is sandwiched between the two ITO layers, is smaller than the electrode potential difference B but is normally not zero.

Figure 11:
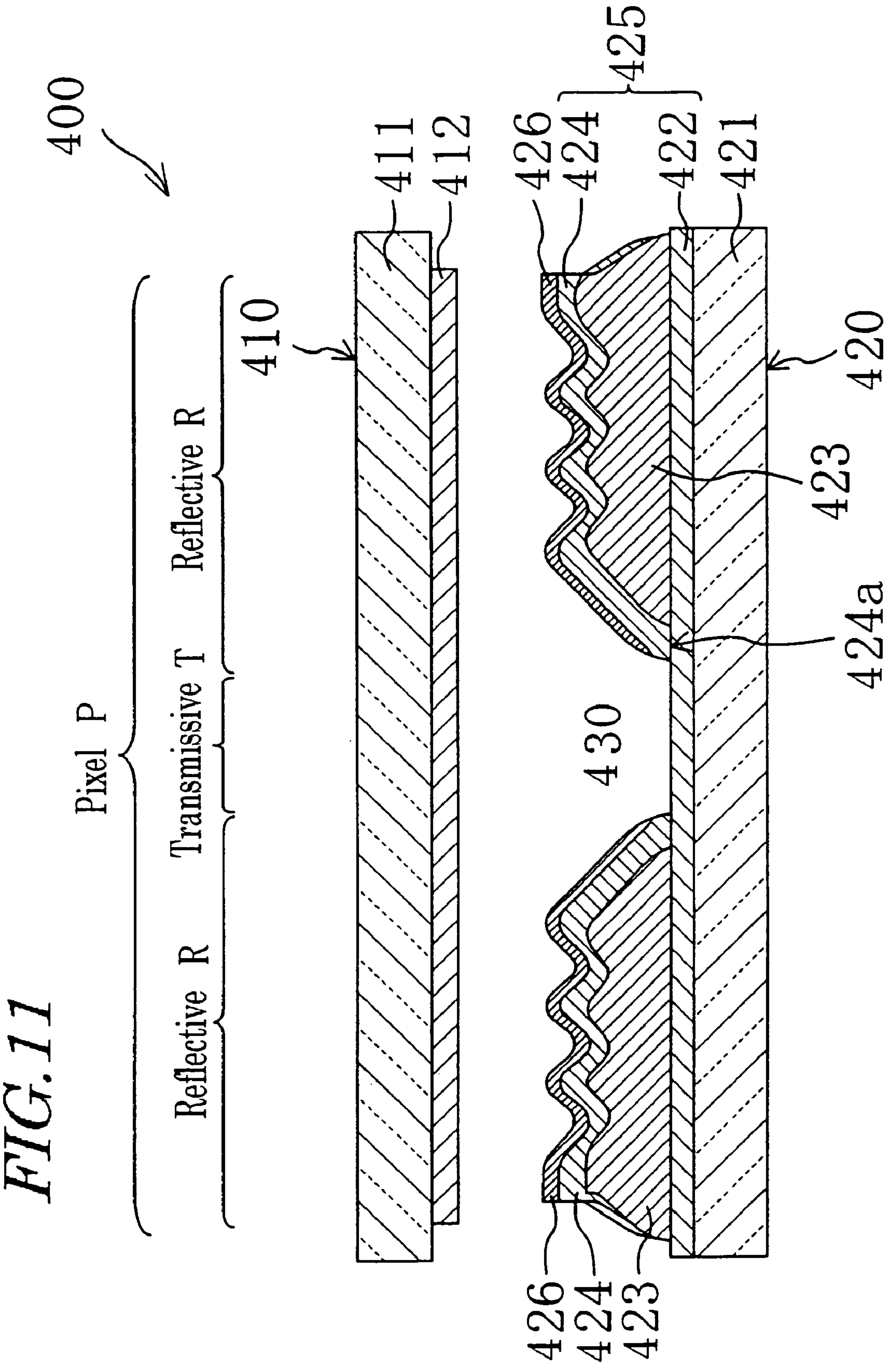
FIG. 11 is a cross-sectional view schematically illustrating the structure of a dual-mode liquid crystal display device 400 according to a second specific preferred embodiment of the present invention as viewed on a plane XI-XI shown in FIG. 12.
Figure 12:
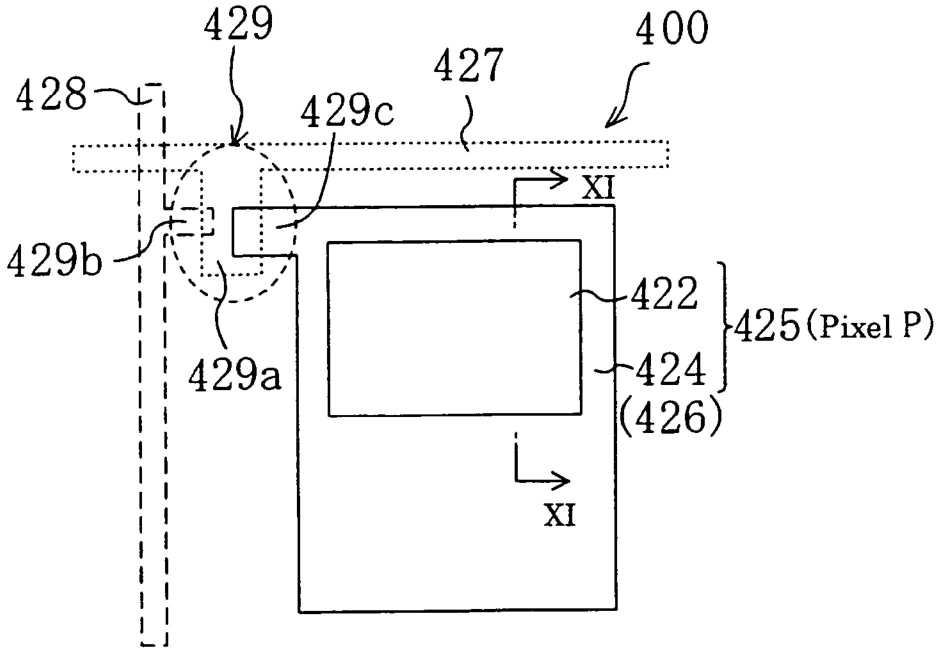
FIG. 12 is a plan view schematically illustrating the structure of one pixel of the dual-mode liquid crystal display device 400 according to the second preferred embodiment.

Hereinafter, the structure and operation of a dual-mode liquid crystal display device 400 according to the second preferred embodiment of the present invention will be described with reference to FIGS. 11 and 12. FIGS. 11 and 12 schematically illustrate the configuration of one pixel P of the liquid crystal display device 400. FIG. 11 is a cross-sectional view of the pixel P as viewed along the line XI-XI shown in FIG. 12.

As shown in FIG. 11, the liquid crystal display device 400 includes a counter substrate 410, an active matrix substrate 420 and a liquid crystal layer 430, which is sandwiched between the two substrates 410 and 420 that face each other.

The counter substrate 410 includes a glass substrate 411. On the outer surface of the glass substrate 411, a phase plate, a polarizer and an antireflective film (none of which is shown in FIG. 11) are provided in this order to control the incoming light. On the other hand, on the inner surface of the glass substrate 411, an RGB color filter layer (not shown) for use to conduct a color display operation, a transparent common electrode 412 made of ITO, for example, and an alignment film (not shown) that has been subjected to a rubbing treatment are provided in this order.

The active matrix substrate 420 includes a glass substrate 421. On the inner surface of the glass substrate 421, multiple gate bus lines (or scanning lines) 427 are formed so as to extend parallelly to each other, and are covered with an insulating film (or gate insulating film; not shown). On the insulating film, multiple source bus lines (or signal lines) 428 are formed so as to extend parallelly to each other and vertically to the gate bus lines 427. At each of the intersections between the gate bus lines 427 and the source bus lines 428, a TFT 429 is provided as a three-terminal nonlinear switching element. The gate electrode 429*a* of each TFT 429 is connected to associated one of the gate bus lines 427. The source electrode 429*b* of the TFT 429 is connected to associated one of the source bus lines 428. And the drain electrode 429*c* of the TFT 429 is connected to a substantially rectangular transparent electrode 422, which is provided on the insulating film and may be made of ITO (with a work function of about 4.9 eV), for example.

An interlevel dielectric film 423 with a finely embossed pattern on the surface thereof is provided on the transparent electrode 422. A reflective electrode 424, which is made of Al (with a work function of about 4.3 eV), for example, is formed thereon so as to cover the interlevel dielectric film 423. The reflective electrode 424 has a rectangular opening, in which the transparent electrode 422 is exposed. The periphery of the opening of the reflective electrode 424 is used as a contact portion 424*a* to electrically connect the transparent electrode 422 and the reflective electrode 424 together.

As shown in FIG. 11, the exposed portion of the transparent electrode 422 (i.e., transmissive electrode region) defines a transmissive portion T of the pixel P, while the reflective electrode 424 (i.e., reflective electrode region) that surrounds the transparent electrode 422 defines a reflective portion R of the pixel P. That is to say, one pixel electrode 425 is made up of the transparent electrode 422 and the reflective electrode 424 and one pixel P is made up of the reflective portion R and the transmissive portion T.

In the liquid crystal display device 400 of this second preferred embodiment, the surface of the reflective electrode 424 is covered with an amorphous transparent conductive film 426 made of InZnOx (which is an oxide mainly composed of indium oxide ($In_2O_3$) and zinc oxide (ZnO) and has a work function of about 4.8 eV). Thus, the electrode potential difference created in the reflective portion R (i.e., a voltage that is applied to a portion of the liquid crystal layer 430 between the transparent common electrode 412 on the counter substrate 410 and the amorphous transparent conductive film 426 on the active matrix substrate 420) is approximately equal to the electrode potential difference created in the transmissive portion T (i.e., a voltage that is applied to a portion of the liquid crystal layer 430 between the transparent common electrode 412 on the counter substrate 410 and the transparent electrode 422 on the active matrix substrate 420). More specifically, the difference between the work function of the amorphous transparent conductive film 426 that covers the reflective electrode 424 and that of the transparent electrode 422 is within 0.3 eV. It should be noted that when the reflective electrode 424 made of Al is covered with the InZnOx film, the reflective electrode 424 and the amorphous transparent conductive film 426 can be formed simultaneously by performing a single etching process with a weakly acidic etchant for use to etch Al.

The pixel electrode 425 on the inner surface of the active matrix substrate 420 is covered with an alignment film (not shown) that has been subjected to a rubbing treatment.

The liquid crystal layer 430 may be made of a nematic liquid crystal material having electro-optical properties.

In the liquid crystal display device 400 having such a configuration, externally incoming light is transmitted through the counter substrate 410, is reflected from the reflective electrode 424, and then goes out through the counter substrate 410 in the reflective portion R. In the transmissive portion T on the other hand, additional light, which has been emitted from a backlight (not shown) disposed behind the active matrix substrate 420, enters the device 400 through the active matrix substrate 420, is transmitted through the transparent electrode 422 and then goes out through the counter substrate 410. By controlling the voltage to be applied to a portion of the liquid crystal layer 430 between the electrodes on the substrates 410 and 420 on a pixel-by-pixel basis, the orientation states of liquid crystal molecules in the liquid crystal layer 430 are changed, thereby adjusting the quantity of light that goes out through the counter substrate 410 and displaying an image as intended.

In the dual-mode liquid crystal display device 400 having such a configuration, the reflective electrode 424 is covered with the amorphous transparent conductive film 426, and the electrode potential difference created in the reflective portion R can be substantially equalized with the electrode potential difference created in the transmissive portion T. That is to say, a DC voltage to be applied to a portion of the liquid crystal layer 430 corresponding to the reflective portion R can be approximately equal to a DC voltage to be applied to a portion of the liquid crystal layer 430 corresponding to the transmissive portion T. Accordingly, when a voltage is applied to each pair of electrodes 412 and 424 or 412 and 422 during a display operation, almost uniform voltages are applied within one pixel P. As a result, an image of quality can be displayed.

In each pixel electrode 525 of the conventional dual-mode liquid crystal display device 500 shown in FIG. 14, the work function of the material of the reflective electrode 524 is greatly different from that of the material of the transparent electrode 522 as described above. For example, if the electrodes 524 and 522 are made of Al and ITO, respectively, the difference in work function is 0.6 eV or more. Thus, the electrode potential difference created in the reflective portion R' is far apart from the electrode potential difference created in the transmissive portion T'. However, only one offset voltage is applicable to all pixels P'. Accordingly, an optimum offset voltage can be defined for one of the transmissive portion T' and the reflective portion R' in such a manner that the electrode potential difference between the electrodes and the feedthrough voltage can be canceled and that no DC voltage having an effective value is applied to the liquid crystal layer 530. But as for the other portion T' or R', a DC voltage having an effective value is applied to the liquid crystal layer 530. That is to say, an AC voltage to be applied to that portion of the liquid crystal layer 530 will have an asymmetric waveform. If the image displayed in such a state is watched with the eyes, then it can be seen that a quite perceivable flicker has been produced and the image quality has degraded significantly. Furthermore, if the DC voltage is continuously applied to the liquid crystal layer for a long time, then the reliability of the liquid crystal material might be affected as well.

In contrast, in the liquid crystal display device 400 of this second preferred embodiment, the electrode potential level at the amorphous transparent conductive film 426 (made of InZnOx, for example) that covers the reflective electrode 424 is approximately equal to the electrode potential level at the transparent electrode 422 (made of ITO, for example). Thus, the electrode potential difference created in the reflective portion R is substantially equal to the electrode potential difference created in the transmissive portion T. Accordingly, these electrode potential differences and the feedthrough voltage can be canceled with just one offset voltage applied so that no DC voltage having an effective value is applied to the liquid crystal layer 430. As a result, an image of quality can be displayed both in the reflective portion R and the transmissive portion T without allowing the observer to perceive any flicker. In addition, since no DC voltage is applied to the liquid crystal layer 430, the unwanted decrease in reliability of the liquid crystal material is also avoidable.

Furthermore, in the liquid crystal display device 400 of this preferred embodiment, the difference between the work function of the amorphous transparent conductive film 426 that covers the reflective electrode 424 and that of the transparent electrode 422 is within 0.3 eV. Thus, the effects expected when the electrode potential level at the amorphous transparent conductive film 426 on the reflective electrode 424 is approximately equal to the electrode potential level at the transparent electrode 422 can be achieved fully.

The present inventors also made a number of liquid crystal display devices for experimental purposes with the difference in work function between the amorphous transparent conductive film and the transparent electrode changed. Specifically, four types of liquid crystal display devices having the configuration described above were prepared. In each of the four devices, the amorphous transparent conductive film covering the reflective electrode of Al was made of InZnOx, and the transparent electrode was made of ITO. However, by forming the transparent electrodes under mutually different conditions, the difference in work function between the amorphous transparent conductive film and the transparent electrode was changed so as to be 0.1 eV, 0.2 eV, 0.3 eV or 0.4 eV. Also, as in the preferred embodiment described above, an offset voltage was defined at such a value that no DC voltage was applied to a portion of the liquid crystal layer corresponding to the reflective portion. Each of the four devices was driven at a normal frequency of 60 Hz. The following Table 3 shows the resultant display qualities of the four types of devices:

TABLE 3

| | Difference in work function | | | |
|---|---|---|---|---|
| | 0.1 eV | 0.2 eV | 0.3 eV | 0.4 eV |
| Display quality | Good | Good | Good | Some flickers perceived |

As can be seen from the results shown in Table 3, if the difference in work function between the amorphous transparent conductive film and the transparent electrode was 0.3 eV or less, no brightness variation was perceived in either the reflective portion or the transmissive portion and good display quality was realized. However, when the difference in work function was 0.4 eV, some flickers were perceived in the transmissive portion. The reasons are believed to be as follows. Specifically, if the work function difference is within 0.3 eV, the gap between the electrode potential differences created in the reflective and transmissive portions is so narrow (or substantially zero) that both of these electrode potential differences can be canceled with the application of a single offset voltage. On the other hand, if the work function difference is 0.4 eV, the gap between the electrode potential differences created in the reflective and transmissive portions is rather wide, and it is difficult to cancel these electrode potential differences with the application of just one offset voltage. For these reasons, the difference in work function between the amorphous transparent conductive film and the transparent electrode is preferably smaller than 0.4 eV, more preferably 0.3 eV or less.

Furthermore, in the liquid crystal display device 400 of this preferred embodiment, the amorphous transparent conductive film 426 that covers the reflective electrode 424 has a thickness of 1 nm to 20 nm. When the amorphous transparent conductive film 426 has a thickness falling within this range, the film 426 can have a uniform thickness and an image of quality can be displayed. By covering the reflective electrode 424 with the amorphous transparent conductive film 426, the electrode potential difference created in the reflective portion R can normally be approximately equal to the electrode potential difference created in the transmissive portion T. However, if the amorphous transparent conductive film 426 was as thick as several hundreds nanometers, much of the incoming light would be absorbed into the amorphous transparent conductive film 426 and just a small quantity of light would be reflected from the reflective electrode 424. Also, interference should occur between the light reflected from the surface of the amorphous transparent conductive film 426 and the light reflected from the surface of the reflective electrode 424 to color the outgoing light unintentionally and degrade the quality of the image displayed.

Figure 13:
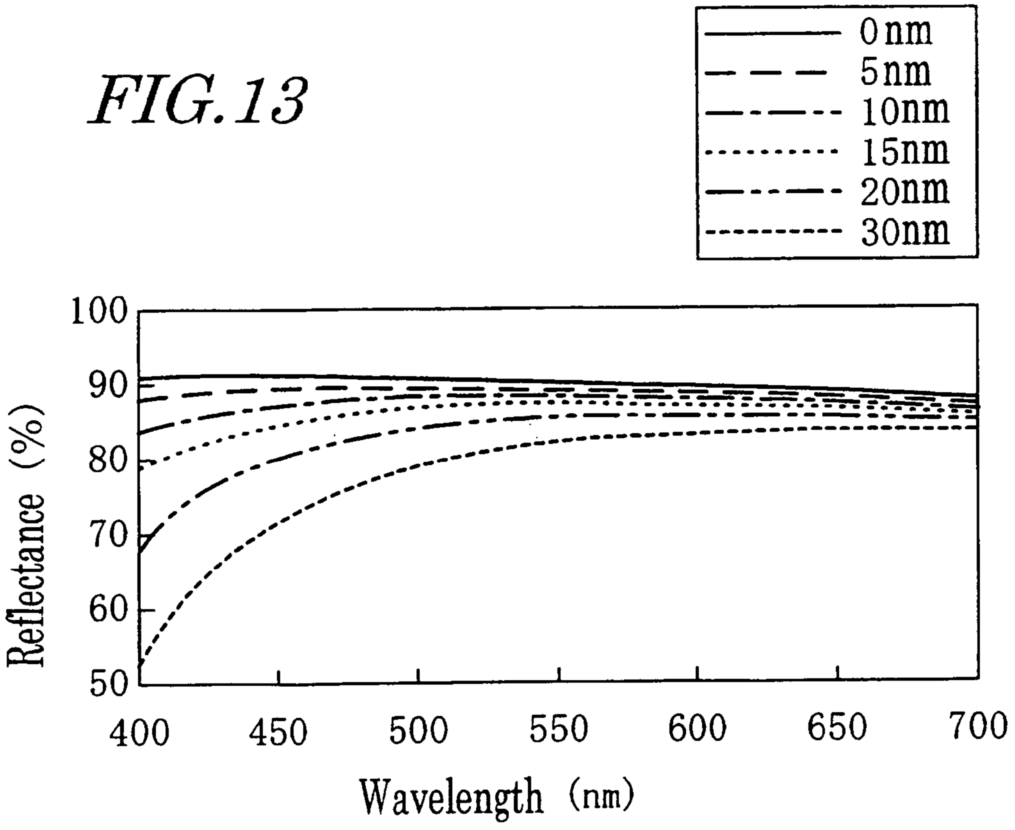
FIG. 13 is a graph showing the relationships between the wavelength of light and the reflectance for various thicknesses of an amorphous transparent conductive film.

The present inventors also made a number of liquid crystal display devices for experimental purposes with the thickness of the amorphous transparent conductive film changed. Specifically, five types of liquid crystal display devices having the configuration described above were prepared. In each of the five devices, the amorphous transparent conductive film covering the reflective electrode of Al was made of InZnOx, and the transparent electrode was made of ITO. However, the amorphous transparent conductive films of the five devices had thicknesses of 5 nm, 10 nm, 15 nm, 20 nm and 30 nm, respectively. FIG. 13 shows the relationships between the wavelength and the reflectance of the incoming light for the five types of devices including the amorphous transparent conductive films with the respective thicknesses. FIG. 13 also shows the relationship between the wavelength and the reflectance for a comparative device including no amorphous transparent conductive film (i.e., including an amorphous transparent conductive film having a thickness of 0 nm).

As can be seen from FIG. 13, the thicker the amorphous transparent conductive film, the lower the reflectance. It can also be seen that the shorter the wavelength of the incoming light, the lower the reflectance.

In a dual-mode liquid crystal display device, the quality of an image displayed is directly affected by the hue of the reflective electrode. Accordingly, it is important to control the thickness of the amorphous transparent conductive film on the reflective electrode. The following Table 4 shows the resultant display qualities of the five types of liquid crystal display devices that were evaluated with the eyes:

TABLE 4

| | Thickness | | | | |
|---|---|---|---|---|---|
| | 5 nm | 10 nm | 15 nm | 20 nm | 30 nm |
| Display Quality | Normal | Normal | Normal | Normal | Colored |

As can be seen from the results shown in Table 4, when the amorphous transparent conductive film had a thickness of 20 nm or less, the resultant display quality was good enough. Specifically, the thinner the amorphous transparent conductive film, the less colored the image displayed and the better the display quality. However, when the amorphous transparent conductive film had a thickness of 30 nm, the image displayed was colored noticeably. The reason is believed to be that the image displayed would be affected by the interference of light only slightly when the thickness is 20 nm or less but that the image would be seriously affected by the interference when the thickness is 30 nm. Accordingly, the amorphous transparent conductive film preferably has a thickness of less than 30 nm and more preferably has a thickness of 20 nm or less. The present inventors confirmed that the electrode potential differences created in the reflective and transmissive portions could be substantially equalized with each other even when the amorphous transparent conductive film had a thickness of 1 nm. However, if the thickness is smaller than 1 nm, it is difficult to control the thickness by a sputtering process. For that reason, the amorphous transparent conductive film preferably has a thickness of at least 1 nm.

Some impurities (e.g., ionic impurities) may sometimes enter the liquid crystal layer 430 during the process step of injecting a liquid crystal material into the gap between the substrates or due to the outflow of impurities from a seal resin material into the gap. In a liquid crystal display device to be driven by an alternating current driving technique, if the materials of two electrodes on its pair of substrates are different, then an electrode potential difference is created between the electrodes. In that case, those impurities are adsorbed into one of the two substrates due to electrostatic attraction. As a result, some parts of the display area have adsorbed impurities but others not. In the display area without the impurities adsorbed, a predetermined voltage can be applied to the liquid crystal layer. In the display area with the impurities adsorbed on the other hand, the predetermined voltage cannot be applied to the liquid crystal layer. Then, two different offset voltages should be prepared if possible for these two types of areas. Actually, though, just one offset voltage can be applied at a time. Accordingly, a flicker is produced in the image being displayed in the display area to which the impurities have been adsorbed. This flicker is particularly noticeable in the periphery of the display area because that portion of the display area is seriously affected by the impurities that have flowed out from the seal resin material.

In contrast, in the liquid crystal display device 400 of this preferred embodiment, the electrode potential levels at the pixel electrode 425 and the transparent common electrode 412 can be substantially equalized with each other by making the amorphous transparent conductive film 426 on the reflective electrode 424 of InZnOx, the transparent electrode 422 of ITO and the transparent common electrode 412 of ITO, respectively. Then, the adsorption of those impurities onto the substrates can be minimized, thereby eliminating the flicker due to the adsorption of the impurities onto the substrates and realizing the display of a quality image.

It should be noted that the present invention is in no way limited to the illustrative preferred embodiments described above but may be modified in various other ways.

For example, in the preferred embodiment described above, the reflective electrode 424 is made of Al. Alternatively, the reflective electrode 424 may also be made of Ag or may also have a multilayer structure including Al and Mo layers. The transparent common electrode 412 and the transparent electrode 422 are made of ITO and the amorphous transparent conductive film 426 is made of InZnOx in the preferred embodiment described above. However, these electrodes and film may also be made of another suitable combination of materials.

Also, in the preferred embodiment described above, the reflective electrode 424 is covered with the amorphous transparent conductive film 426. Alternatively, the reflective electrode 424 may also be covered with a crystalline transparent conductive film of ITO, for example.

Furthermore, in the preferred embodiment described above, the TFTs 129 are used as exemplary switching elements. Optionally, MIM (metal-insulator-metal) elements, which are two-terminal nonlinear elements, may also be used as alternative switching elements. It should be noted that when MIM elements are used, positive and negative feedthrough voltages will be generated and will cancel each other. Therefore the offset voltage for an MIM liquid crystal display device should be defined differently from a TFT liquid crystal display device.

Moreover, in the preferred embodiment described above, the electrode potential differences created in the reflective and transmissive portions R and T are substantially equalized with each other by covering the reflective electrode 424 with the amorphous transparent conductive film 426. However, these electrode potential differences may also be equalized by any other technique. For example, even if the reflective electrode 424 is subjected to some surface treatment using oxygen plasma, UV ozone or any other suitable substance, the work function of the reflective electrode can also be brought closer to that of the transparent electrode and the electrode potential differences created in the reflective and transmissive portions can also be substantially equalized with each other. As another alternative, the work functions of the reflective and transparent electrodes can also be matched, and the electrode potential differences created in the reflective and transmissive portions can also be substantially equalized, by coating the respective surfaces of the reflective and transparent electrodes with a thin film of Au having a thickness of about 0.4 nm, for example. It should be noted that the Au thin film with a thickness of about 0.4 nm does not affect the transmittance of the transparent electrode. Optionally, the (apparent) work function of the reflective electrode can also be brought closer to that of the transparent electrode, and the electrode potential differences created in the reflective and transmissive portions can also be substantially equalized, either by forming a predetermined insulating film on the reflective electrode or by coating the surface of the reflective electrode with a predetermined organic material (e.g., an alignment film material).

Embodiment 3

Hereinafter, the configuration and operation of a liquid crystal display device 600 according to a third specific preferred embodiment of the present invention will be described with reference to FIGS. 16 through 20. The liquid crystal display device 600 of this third preferred embodiment is also a dual-mode display device of which each pixel includes a reflective portion and a transmissive portion. However, unlike the liquid crystal display device 400 of the second preferred embodiment described above, the liquid crystal display device 600 of the third preferred embodiment includes a structure that can electrically compensate for the gap between the electrode potential differences created in the reflective and transmissive portions.

Figure 16:
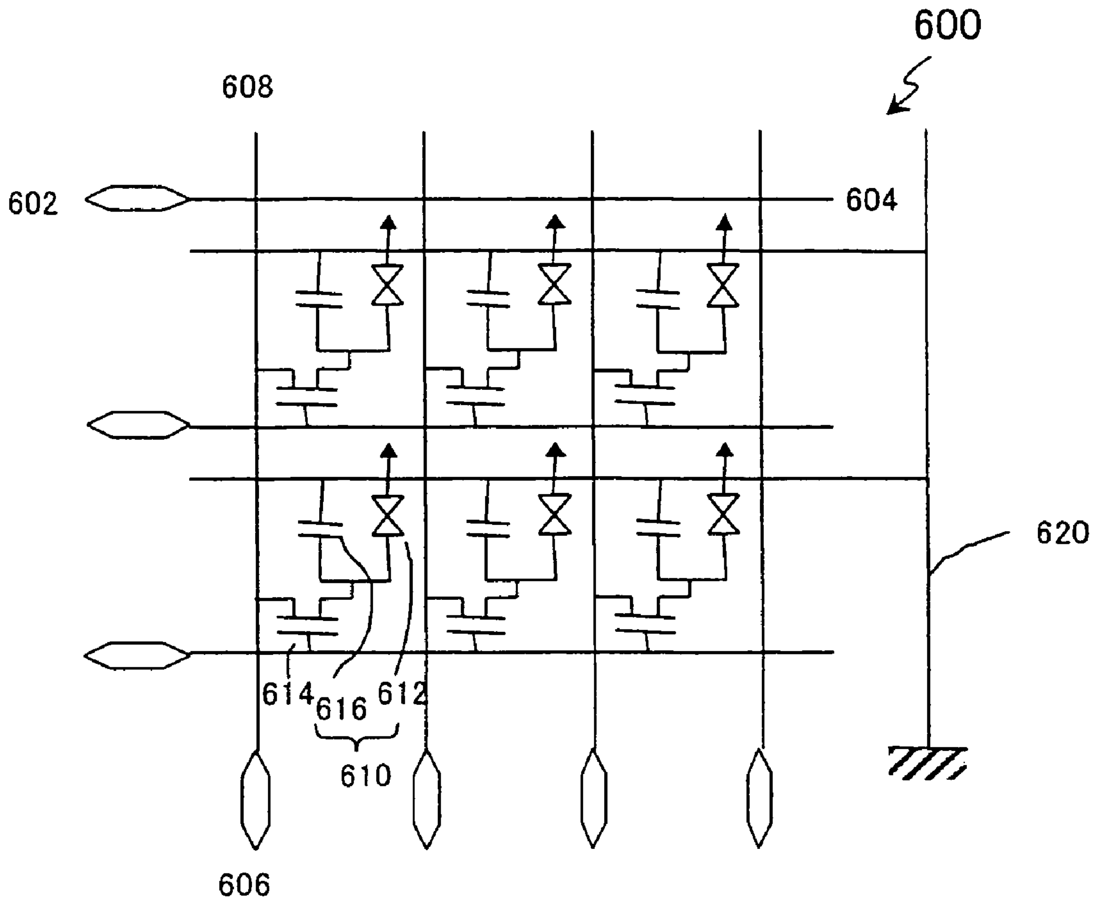
FIG. 16 schematically shows the arrangement of a liquid crystal display device 600 according to a third specific preferred embodiment of the present invention.
Figure 17A:
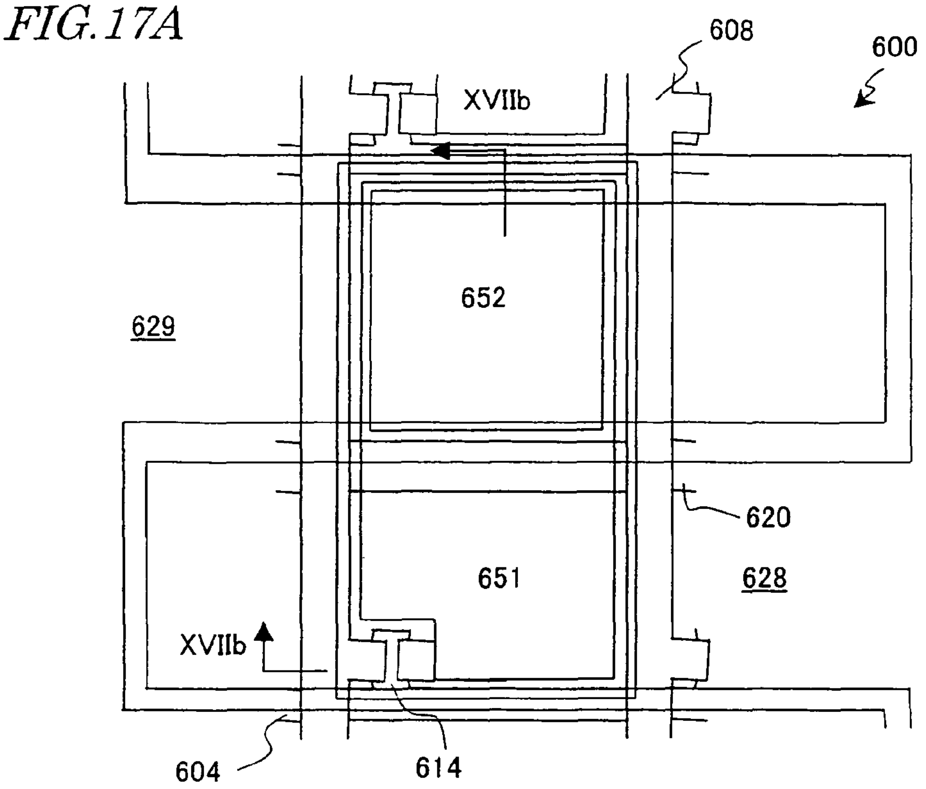
FIGS. 17A and 17B are respectively a plan view and a cross-sectional view, taken along the line XVIIb-XVIIb shown in FIG. 17A, schematically illustrating the structure of one pixel of the liquid crystal display device 600 according to the third preferred embodiment.
Figure 17B:
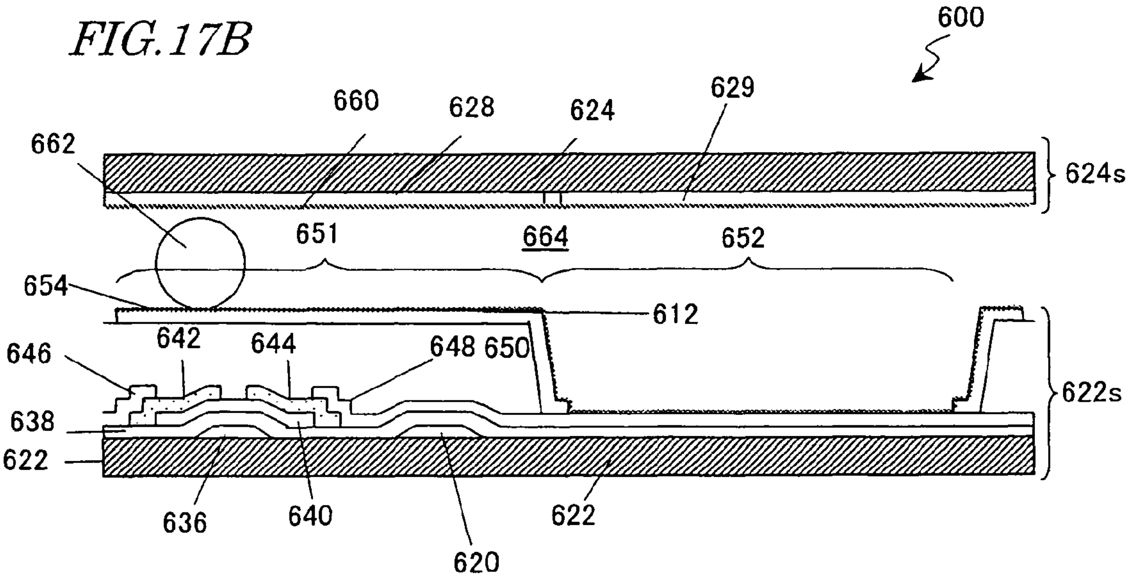

FIG. 16 schematically shows the equivalent circuit of the liquid crystal display device 600. FIGS. 17A and 17B are respectively a plan view and a cross-sectional view, taken along the line XVIIb-XVIIb shown in FIG. 17A, schematically illustrating the structure of one pixel of the liquid crystal display device 600.

As shown in FIG. 16, the liquid crystal display device 600 has the same circuit configuration as a normal active-matrix-addressed liquid crystal display device.

Multiple gate bus lines 604, extending in the row direction, are connected to their respective gate terminals 602, while multiple source bus lines 608, extending in the column direction, are connected to their respective source terminals 606. The gate bus lines 604 are exemplary scanning lines and the source bus lines 608 are exemplary signal lines. A TFT 614 is provided as a switching element near each of the intersections between these two groups of bus lines 604 and 608. The gate electrode (not shown) of each TFT 614 is connected to an associated one of the gate bus lines 604, while the source electrode (not shown) thereof is connected to an associated one of the source bus lines 608. A liquid crystal capacitor (or pixel electrode) 612 and a storage capacitor (or storage capacitor electrode) 616, which together constitute a pixel capacitor 610, are connected in parallel to the drain electrode of each TFT 614. The storage capacitor counter electrodes of the storage capacitors 616 are connected in common to a storage capacitor bus line (or storage capacitor counter electrode line) 620. The liquid crystal capacitor 612 is formed by the pixel electrodes 612, the counter electrode 628 or 629 and the liquid crystal layer 664 that is sandwiched between the pixel electrodes 612 and the counter electrode 628 or 629 as shown in FIGS. 17A and 17B.

The configuration of one pixel of this liquid crystal display device 600 will be described in further detail with reference to FIGS. 17A and 17B.

In the liquid crystal display device 600, each pixel electrode 612 includes a reflective electrode region 651 and a transmissive electrode region 652. In the periphery of the pixel electrode 612, the reflective electrode region 651 partially overlaps with one of the gate bus lines 604 and with one of the source bus lines 608, thereby contributing to increase in the aperture ratio of the pixel. The counter electrode that faces the pixel electrode 612 by way of the liquid crystal layer 664 includes first and second counter electrodes 628 and 629 that face the reflective electrode region 651 and the transmissive electrode region 652, respectively. In this manner, by providing the two counter electrodes 628 and 629 for the reflective and transmissive portions, respectively, the gap between the electrode potential differences created in the reflective and transmissive portions can be electrically compensated for. This operation will be described in detail later.

The cross-sectional structure of the liquid crystal display device 600 will be described with reference to FIG. 17B. It should be noted that the illustration of polarizers, backlight, phase plates and other members to be provided on the outer surfaces of substrates 622 and 624 is omitted in FIG. 17B.

The substrate 622 is a transparent insulating substrate (e.g., glass substrate), on which the gate electrode 636 of the TFT 614 is formed. The gate electrode 636 is covered with a gate insulating film 638, on which a semiconductor layer 640 is provided so as to overlap with the gate electrode 636. Furthermore, $n^+$ Si layers 642 and 644 are provided so as to cover both ends of the semiconductor layer 640. A source electrode 646 is formed on the $n^+$ Si layer 642 on the left-hand side, while a drain electrode 648 is formed on the $n^+$ Si layer 644 on the right-hand side. The drain electrode 648 is extended to a pixel region so as to also function as the transmissive electrode region 652 of the pixel electrode 612. Also, the storage capacitor bus line 620 and the drain electrode 648 together form the storage capacitor 616 (see FIG. 16) with the gate insulating film 638 interposed between them.

An interlevel dielectric film 650 is formed so as to cover all of these members including the gate bus lines 604 and the source bus lines 608. On the interlevel dielectric film 650, the pixel electrode 612 is provided as an Al layer, an alloy layer including Al or a multilayer structure of Al and Mo layers. This portion functions as the reflective electrode region 651. Furthermore, an opening is provided by removing a portion of the interlevel dielectric film 650, and is used as a contact hole, at which the drain electrode 648 of the TFT 614 is connected to the pixel electrode 612 (i.e., the alloy layer that defines the reflective electrode region 651). The extended portion of the drain electrode 648, which is exposed inside the opening of the interlevel dielectric film 650, defines the transmissive electrode region 652. If necessary, the pixel electrode 612 is covered with an alignment film 654.

The other substrate 624 is also a transparent insulating substrate (e.g., a glass substrate), on which a color filter layer (not shown), the counter electrodes 628 and 629 made of a transparent conductive film, and an alignment film 660 are formed in this order. A predetermined gap is provided between these substrates 624 and 622 by spacers 662. The substrates 622 and 624 are bonded together with a seal member around their peripheries.

Figure 18:
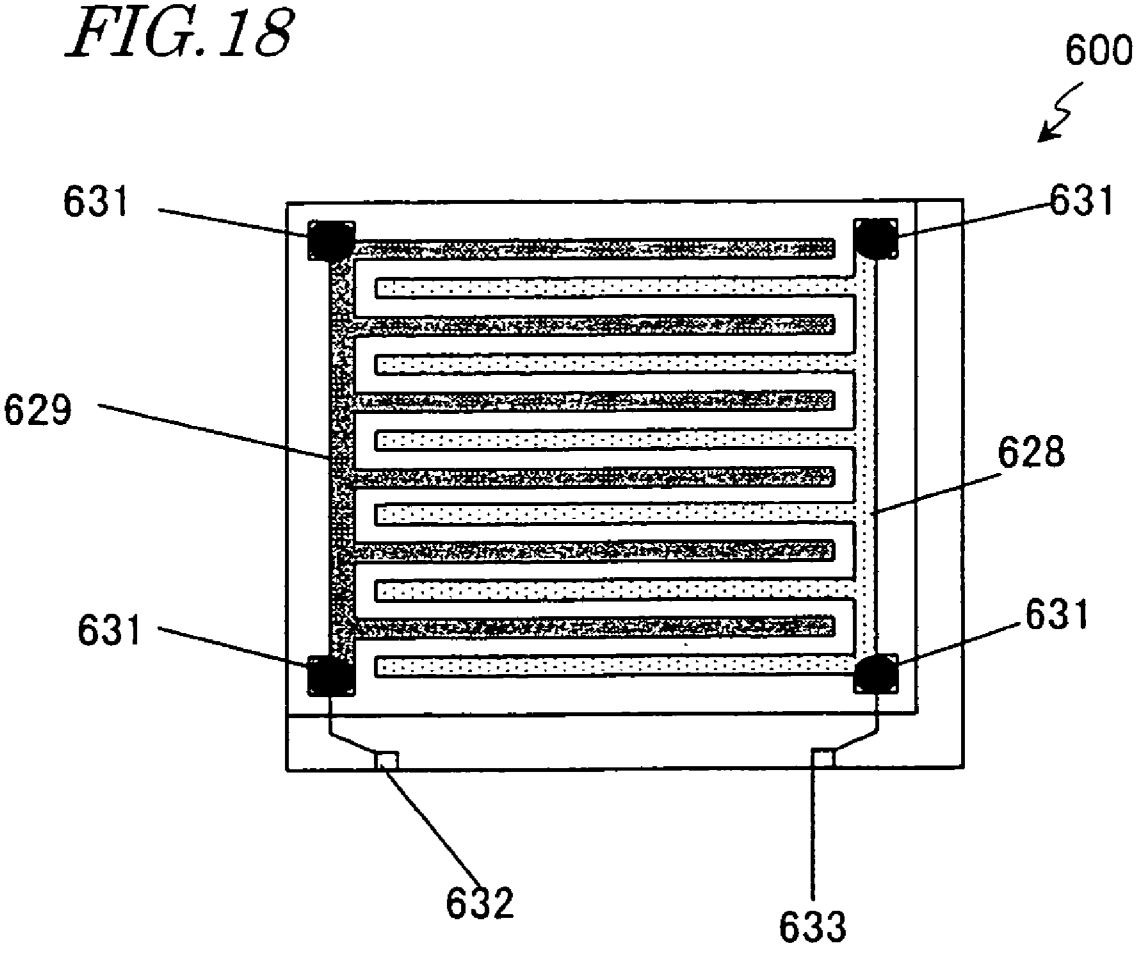
FIG. 18 is a plan view schematically illustrating the configuration of a counter electrode of the liquid crystal display device 600 according to the third preferred embodiment.

In a conventional liquid crystal display device, the counter electrode thereof is made of a single transparent conductive layer (e.g., an ITO layer) that covers the entire display area. On the other hand, the liquid crystal display device 600 includes the two counter electrodes 628 and 629 as described above. As schematically illustrated in FIG. 18, each of the first and second counter electrodes 628 and 629 has been patterned into a comb shape that has multiple branches extending parallelly to the gate bus lines 604. These branches of each comb are bundled together around the periphery of the substrate 624, thereby forming two groups of branches. The first and second counter electrodes 628 and 629 are electrically isolated from each other so that two different common signals (or common voltages) can be applied thereto. Also, as shown in FIG. 17A, the first and second counter electrodes 628 and 629 are disposed such that the two groups of comb branches of the first and second counter electrodes 628 and 629 face the reflective electrode regions 651 and transmissive electrode regions 652, respectively, when the counter substrate 624*s* is bonded with the active matrix substrate 622*s*.

After the counter substrate 624*s* and the active matrix substrate 622*s* are bonded together, the counter electrodes 628 and 629 are connected to common signal input lines (not shown) on the active matrix substrate 622*s* by way of common transfers 631 to input common signals to the counter electrodes 628 and 629. Then, the common signals are input to the counter electrodes 628 and 629 through common signal input terminals 632 and 633, respectively. Alternatively, the common signals may also be input to the counter electrodes 628 and 629 without the common transfers 631.

Figure 19A:
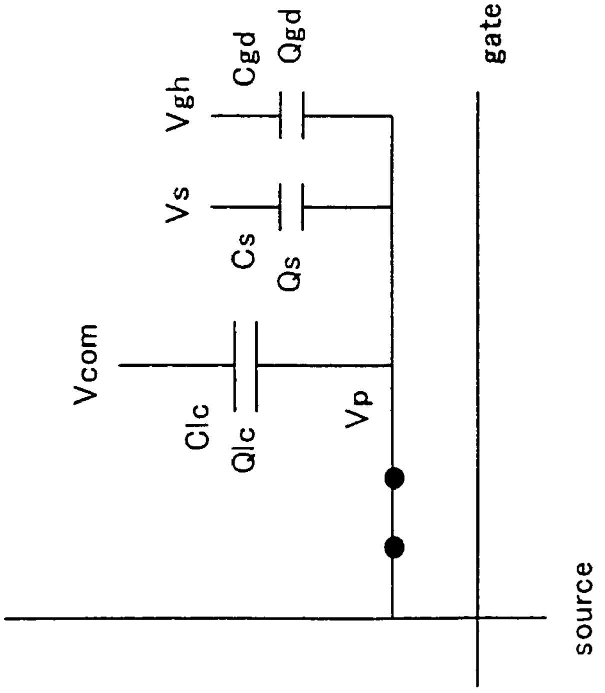
FIGS. 19A and 19B each show an equivalent circuit of one pixel of the liquid crystal display device 600 according to the third preferred embodiment in which the TFT is in ON state and in the OFF state, respectively.
Figure 19B:
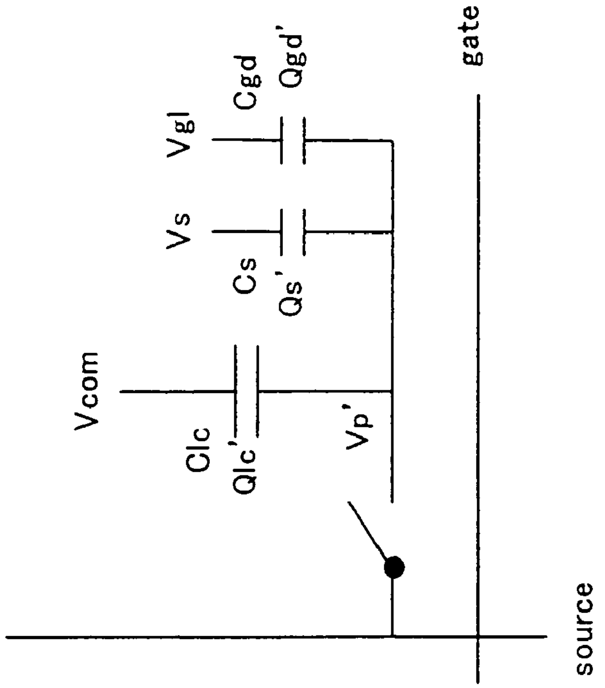
Figure 20:
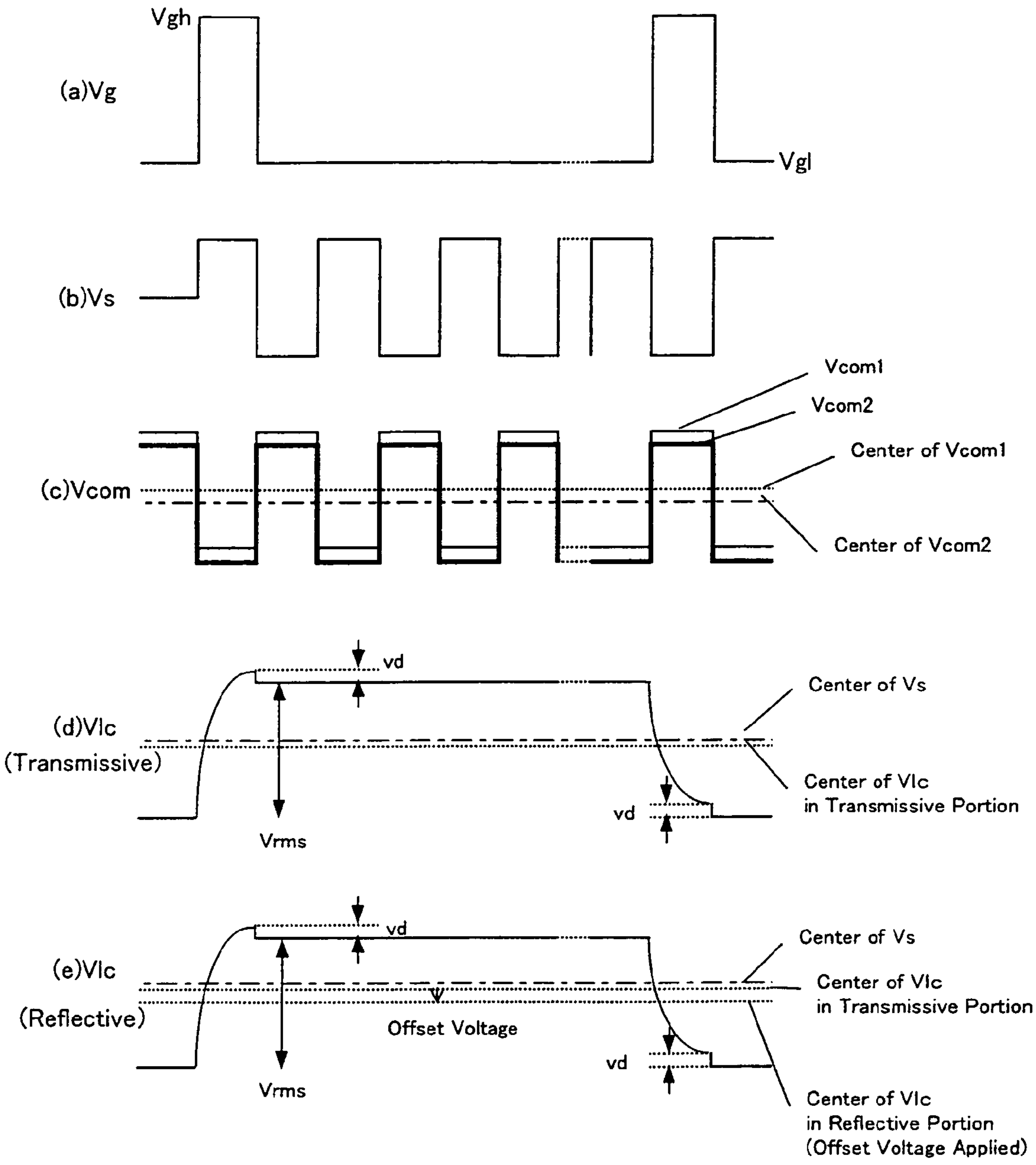
FIG. 20 shows the respective waveforms of signals (a) through (e) for use to drive the liquid crystal display device 600 according to the third preferred embodiment.

Hereinafter, it will be described with reference to FIGS. 19A, 19B and 20 how the liquid crystal display device 600 operates. FIGS. 19A and 19B show the equivalent circuit of one pixel of the liquid crystal display device 600 in which the TFT 614 is in ON state and in OFF state, respectively. FIG. 20 illustrates the respective waveforms of signals (a) through (e) for use to drive the pixel.

The signal waveform (a) shows a gate signal (or scanning signal) Vg to be input to the gate bus line 604. The signal waveform (b) shows a source signal (or display signal or data signal) Vs. The signal waveform (c) shows common signals Vcom (including Vcom1 and Vcom2) to be input to the counter electrodes 628 and 629. The common signals Vcom have the same period as, and a polarity opposite to, the source signal Vs. These common signals Vcom are used to apply the voltage |Vs−Vcom| of a sufficiently great amplitude to the liquid crystal layer, reducing the absolute value (i.e., the amplitude) of the source signal Vs and using a driver (IC) having a low breakdown voltage.

While the TFT 614 is in ON state, a voltage Vp (=Vs) is applied to the pixel electrode and |Vs−Vcom| is applied to the pixel (including the liquid crystal capacitance Clc and the storage capacitance Cs). As a result, charges Qlc and Qs are stored in the liquid crystal capacitance Clc and the storage capacitance Cs, respectively, as shown in FIG. 19A. In this case, a charge Qgd is stored in the gate-drain capacitance Cgd of the TFT 614, to which a gate voltage Vgh (i.e., on-state voltage) is applied.

When the TFT 614 is turned OFF, the state changes into that shown in FIG. 19B. Specifically, the charge stored in the gate-drain capacitance Cgd of the TFT 614, to which a gate voltage Vgl (i.e., off-state voltage) is applied, changes into Qgd'. As a result, the charges stored in the liquid crystal capacitance Clc and the storage capacitance Cs change into Qlc' and Qs', respectively, and the potential level at the pixel electrode changes from Vp into Vp'. Accordingly, when the TFT 614 is turned OFF, the voltage Vlc applied to the pixel decreases as represented by the signal waveforms (d) and (e) in FIG. 20.

This voltage drop is called a "feedthrough voltage" Vd. Every time the polarity of the source voltage Vs is switched, the feedthrough voltage Vd is generated to produce a flicker. As described above, an offset voltage is defined to cancel this feedthrough voltage, and the voltage levels of the common signals Vcom are decreased from the center level of the source voltage Vs by the feedthrough voltage, thereby preventing a flicker.

In a dual-mode liquid crystal display device, a flicker is produced not only by the feedthrough voltage but also by the gap between the electrode potential differences created in the reflective and transmissive portions. For example, a DC voltage of about 200 mV to about 300 mV is additionally applied to a portion of the liquid crystal layer corresponding to the reflective portion between the ITO and Al layers as compared to another portion of the liquid crystal layer corresponding to the transmissive portion between the ITO layers. Thus, an optimum offset voltage (or counter voltage) for the reflective portion is different from an optimum offset voltage for the transmissive portion.

The liquid crystal display device 600 of this third preferred embodiment of the present invention includes the electrically isolated counter electrodes 628 and 629 for the reflective electrode region 651 and the transmissive electrode region 652, respectively, as already described with reference to FIGS. 17 and 18. Accordingly, the liquid crystal display device 600 can supply the common signals Vcom1 and Vcom2 having mutually different center levels to the counter electrodes 628 and 629, respectively, as represented by the signal waveforms (c) shown in FIG. 20.

Thus, as represented by the signal waveforms (d) and (e) shown in FIG. 20, the effective voltage Vrms applied to a portion of the liquid crystal layer corresponding to the transmissive portion can be equalized with the effective voltage Vrms applied to a portion of the liquid crystal layer corresponding to the reflective portion. In addition, the amplitude of each of these voltages Vrms on the positive domain is equal to that of the voltage Vrms on the negative domain. Thus, the flicker can be minimized. In addition, the unwanted decrease in voltage holding ratio due to the degradation of the liquid crystal material, which would be caused if a DC voltage was continuously applied to the liquid crystal layer as in the conventional liquid crystal display device, can also be minimized in the liquid crystal display device 600. As a result, unevenness or spots can be eliminated from portions of an image that are displayed near the seal resin around the periphery of the display panel or near the injection holes.

Next, the configuration and operation of another liquid crystal display device 700 according to the third preferred embodiment of the present invention will be described with reference to FIGS. 21 through 23.

Just like the liquid crystal display device 600 described above, the liquid crystal display device 700 includes two counter electrodes (in the comb shape, for example) for the reflective and transmissive portions, respectively. As in the liquid crystal display device 600, the counter electrodes for the reflective and transmissive portions will also be referred to as first and second counter electrodes 628 and 629, respectively (see FIGS. 17 and 18, for example).

Furthermore, each pixel of the liquid crystal display device 700 includes two TFTs for the reflective and transmissive electrode regions and two storage capacitors for the reflective and transmissive portions, respectively. The liquid crystal display device 700 can also define two offset voltages for the reflective and transmissive portions, respectively, can apply a uniform effective voltage Vrms to a portion of the liquid crystal layer corresponding to one pixel, and thereby can minimize the flicker.

Figure 21:
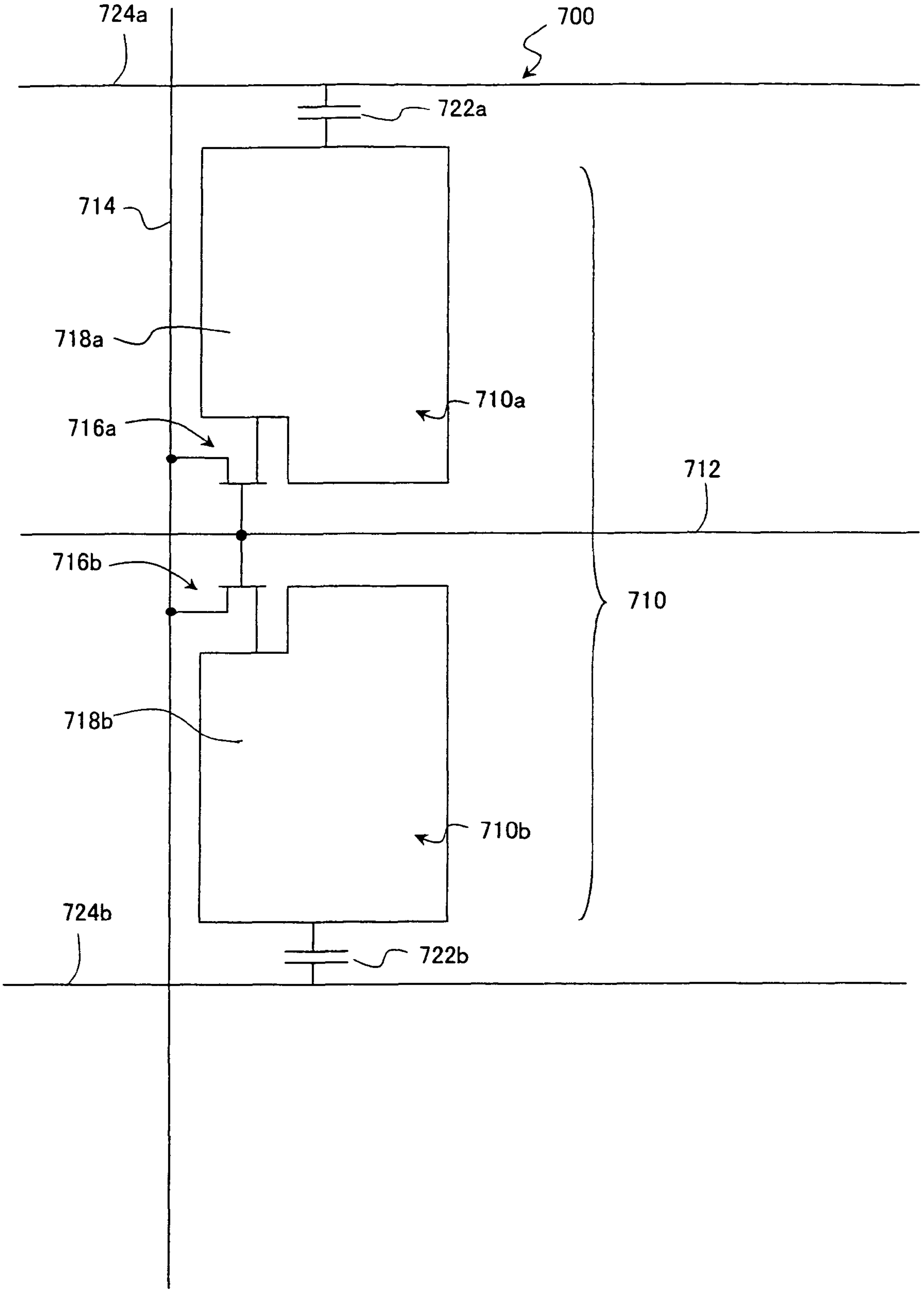
FIG. 21 schematically shows the structure of one pixel of another liquid crystal display device 700 according to the third preferred embodiment.

FIG. 21 schematically shows the structure of one pixel 710 of the liquid crystal display device 700. The pixel 710 includes a reflective portion 710*a* and a transmissive portion 710*b*. TFTs 716*a* and 716*b* are connected to a reflective electrode (or reflective electrode region) 718*a* and a transparent electrode (or transmissive electrode region) 718*b*, respectively. Storage capacitors (CS) 722*a* and 722*b* are also connected to the reflective and transparent electrodes 718*a* and 718*b*, respectively. The gate electrodes of the TFTs 716*a* and 716*b* are both connected to a gate bus line 712, while the source electrodes thereof are both connected to a common (or the same) source bus line 714.

The storage capacitors 722*a* and 722*b* are connected to storage capacitor lines 724*a* and 724*b*, respectively. The storage capacitor 722*a* includes: a storage capacitor electrode that is electrically connected to the reflective electrode 718*a*; a storage capacitor counter electrode that is electrically connected to the storage capacitor line 724*a*; and an insulating layer (not shown) interposed between these two electrodes. The storage capacitor 722*b* includes: a storage capacitor electrode that is electrically connected to the transparent electrode 718*b*; a storage capacitor counter electrode that is electrically connected to the storage capacitor line 724*b*; and an insulating layer (not shown) interposed between these two electrodes. The storage capacitor counter electrodes of the storage capacitors 722*a* and 722*b* are electrically isolated from each other and can be supplied with mutually different storage capacitor counter voltages from the storage capacitor lines 724*a* and 724*b*, respectively. The same common signal as that applied to the first counter electrode 628 is also applied to the storage capacitor line 724*a* for the reflective portion 710*a*, and the same common signal as that applied to the second counter electrode 629 is also applied to the storage capacitor line 724*b* for the transmissive portion 710*b*.

Figure 22:
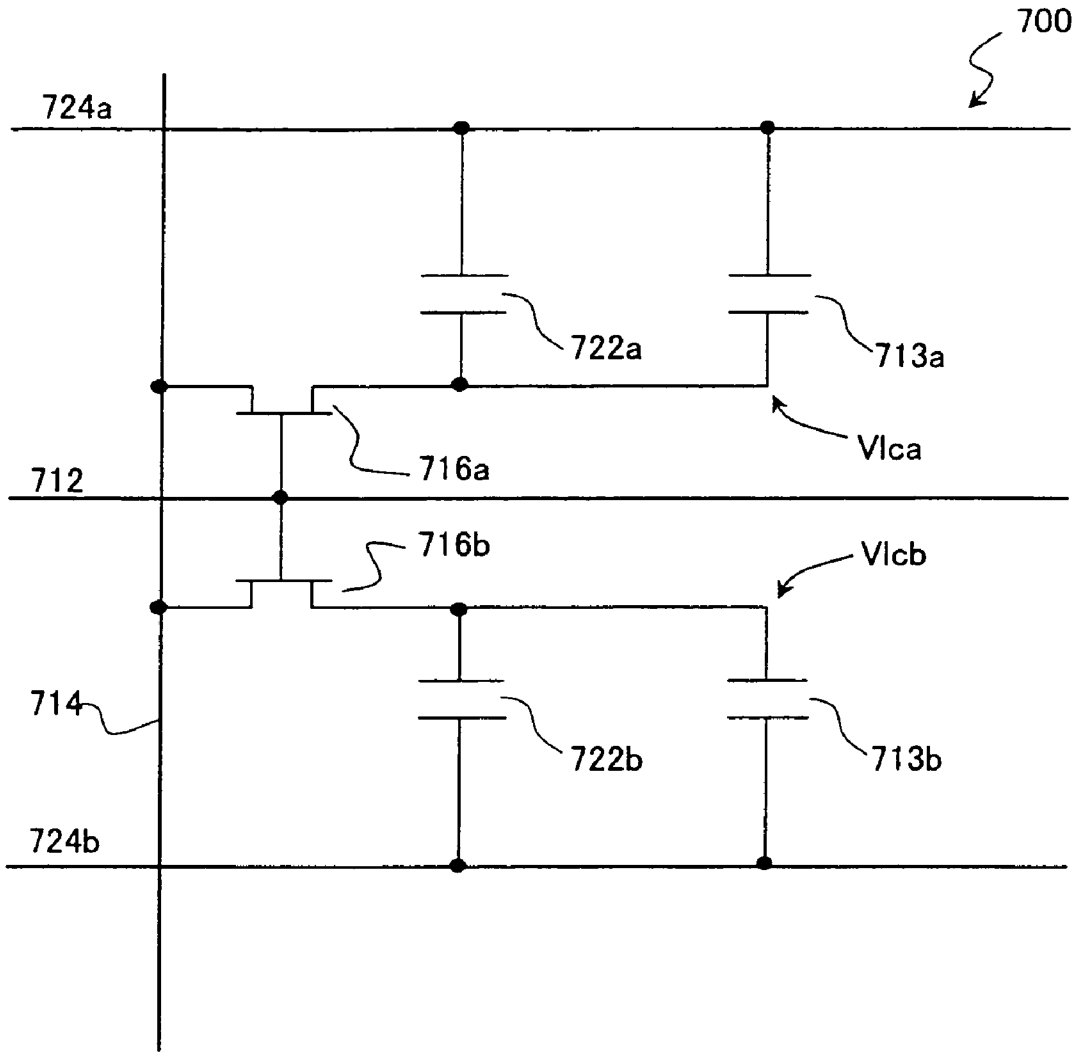
FIG. 22 schematically shows an equivalent circuit of one pixel of the liquid crystal display device 700 shown in FIG. 21.

FIG. 22 schematically shows the equivalent circuit of one pixel of the liquid crystal display device 700. In this electrical equivalent circuit, portions of the liquid crystal layer corresponding to the reflective and transmissive portions 710*a* and 710*b* are identified by the reference numerals 713*a* and 713*b*, respectively. A liquid crystal capacitor that is formed by the reflective electrode 718*a*, the liquid crystal layer 713*a* and the first counter electrode will be identified by Clca, while a liquid crystal capacitor that is formed by the transparent electrode 718*b*, the liquid crystal layer 713*b* and the second counter electrode will be identified by Clcb. Also, the storage capacitors 722*a* and 722*b*, which are electrically isolated from each other and connected to the liquid crystal capacitors Clca and Clcb of the reflective and transmissive portions 710*a* and 710*b*, respectively, will be identified by Ccsa and Ccsb, respectively.

In the reflective portion 710*a*, one electrode of the liquid crystal capacitor Clca and one electrode of the storage capacitor Ccsa are connected to the drain electrode of the TFT 716*a* that is provided to drive the reflective portion 710*a*, while the other electrode of the liquid crystal capacitor Clca and the other electrode of the storage capacitor Ccsa are connected to the storage capacitor line 724*a*. In the transmissive portion 710*b* on the other hand, one electrode of the liquid crystal capacitor Clcb and one electrode of the storage capacitor Ccsb are connected to the drain electrode of the TFT 716*b* that is provided to drive the transmissive portion 710*b*, while the other electrode of the liquid crystal capacitor Clcb and the other electrode of the storage capacitor Ccsb are connected to the storage capacitor line 724*b*. The gate electrodes of the TFTs 716*a* and 716*b* are both connected to the gate bus line 712 while the source electrodes thereof are both connected to the source bus line 714.

Next, it will be described with reference to FIG. 23 how this liquid crystal display device 700 operates. FIG. 23 schematically shows the waveforms and timings of respective voltages for use to drive the liquid crystal display device 700.

Figure 23:
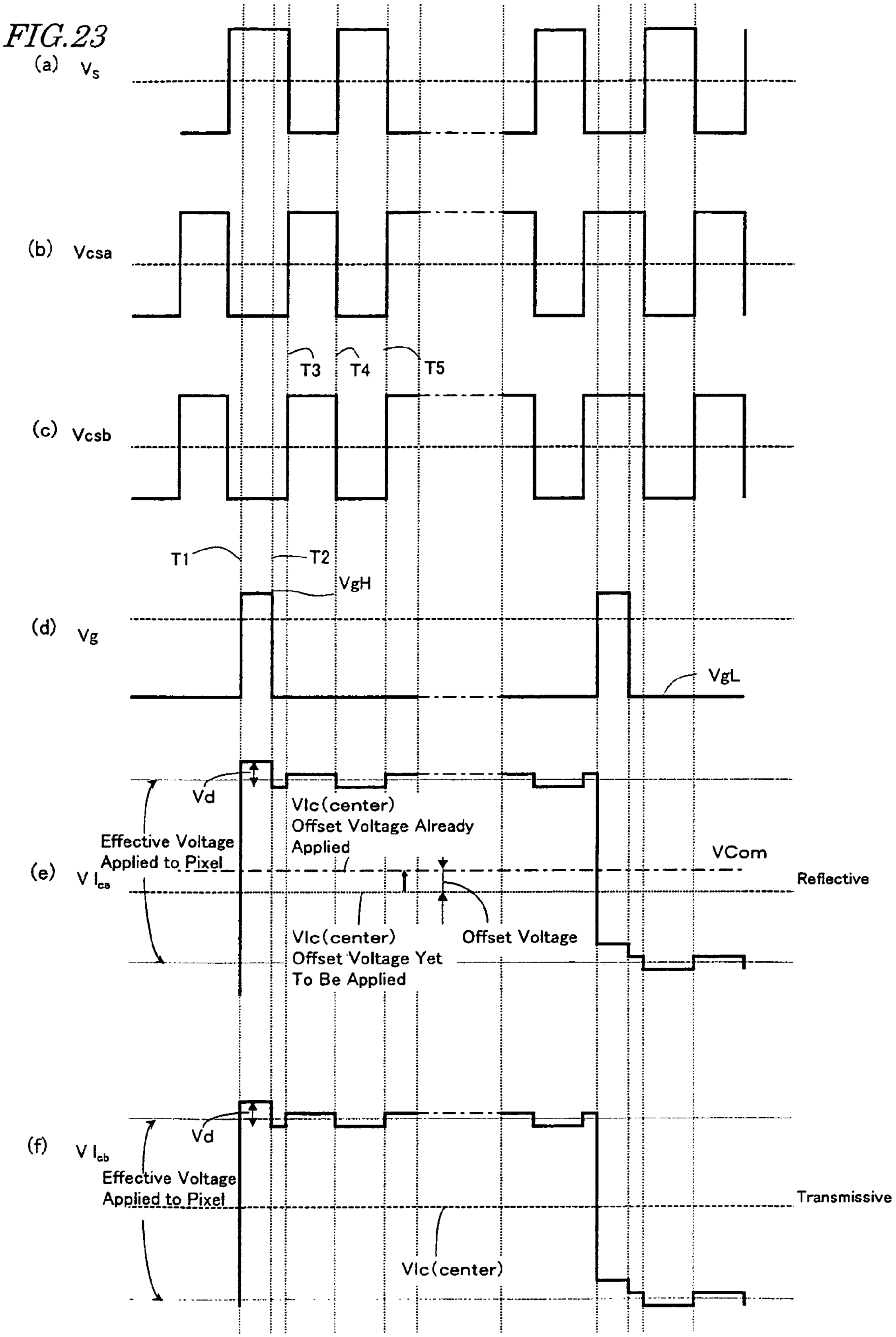
FIG. 23 schematically shows the waveforms and timings of respective voltages for use to drive the liquid crystal display device 700.

Portions (a), (b), (c), (d), (e) and (f) of FIG. 23 show the waveform of the source signal Vs on the source bus line 714, the waveform of the common signal Vcsa on the storage capacitor line 724*a*, the waveform of the common signal Vcsb on the storage capacitor line 724*b*, the waveform of the gate signal Vg on the gate bus line 712, the waveform of the voltage Vlca applied to the reflective electrode 718*a*, and the waveform of the voltage Vlcb applied to the transparent electrode 718*b*, respectively. The same common signal Vcsa as that applied to the storage capacitor line 724*a* as shown in portion (b) of FIG. 23 is also applied to the first counter electrode 628 for the reflective portion 710*a*. On the other hand, the same common signal Vcsb as that applied to the storage capacitor line 724*b* as shown in portion (c) of FIG. 23 is also applied to the second counter electrode 629 for the transmissive portion 710*b*.

First, at a time T1, the gate voltage Vg changes from VgL into VgH, thereby turning the two TFTs 716*a* and 716*b* ON simultaneously. As a result, the source voltage Vs on the source bus line 714 is supplied to the reflective and transparent electrodes 718*a* and 718*b* and the liquid crystal capacitors Clca and Clcb of the reflective and transmissive portions 710*a* and 710*b* are charged. The storage capacitors Ccsa and Ccsb thereof are also charged in the meantime.

Next, at a time T2, the gate voltage Vg on the gate bus line 712 changes from VgH into VgL, thereby turning the TFTs 716*a* and 716*b* OFF simultaneously. As a result, the liquid crystal capacitors Clca and Clcb and the storage capacitors Ccsa and Ccsb are all electrically isolated from the source bus line 714. Immediately after the TFTs 716*a* and 716*b* have been turned OFF, a feedthrough phenomenon occurs due to the parasitic capacitances associated with the TFTs 716*a* and 716*b*, thereby decreasing the voltages Vlca and Vlcb to be applied to the reflective and transparent electrodes 718*a* and 718*b* by approximately the same quantity Vd.

Next, at each of times T3, T4 and T5, the common voltages Vcsa and Vcsb are applied to the storage capacitor counter electrodes and the voltages Vlca and Vlcb are applied to the reflective and transparent electrodes 718*a* and 718*b*, respectively.

The voltages Vlca and Vlcb applied to the reflective and transparent electrodes 718*a* and 718*b* will be described.

Suppose signals having the same voltage and the same amplitude are applied as the common signals Vcsa and Vcsb to the storage capacitor counter electrodes as shown in portions (b) and (c) of FIG. 23. Also, if the reflective electrode 718*a* is made of Al, then the electrode potential difference created between the Al reflective electrode 718*a* and the ITO counter electrode 628 is different from the electrode potential difference created between the ITO transparent electrode 718*b* and the ITO counter electrode 629. Accordingly, in that case, since the electrode potential difference (or DC voltage) is further added thereto, the voltage applied to the reflective electrode 718*a* has the signal waveform Vlca with a positively-shifted (or increased) voltage level as shown in portion (e) of FIG. 23 before an offset voltage is applied thereto. As a result, a flicker is produced. Thus, the offset voltage is applied so that the center level of the voltage applied to the reflective electrode 718*a* gets equal to that of the common voltage Vcsa applied to the counter electrode 628. Then, the DC voltage created by the electrode potential difference can be canceled. As a result, an image of quality can be displayed without allowing the observer to perceive any flicker.

In this manner, by defining best counter voltages (or storage capacitor counter voltages) for the reflective and transmissive portions 710*a* and 710*b* in such a manner as to cancel the DC voltage, the flicker can be minimized.

As described above, the liquid crystal display device 600 or 700 according to the third preferred embodiment of the present invention includes two electrically isolated counter electrodes that face the reflective electrode region and the transmissive electrode region, respectively. A common signal, which has the same polarity, the same period and the same amplitude as a common signal to be supplied to the counter electrode that faces the transmissive electrode region but which has had its center level shifted by an offset DC voltage, is supplied to the counter electrode that faces the reflective electrode region. Thus, the offset DC voltage, which is generated due to the difference between the electrode potential differences created in the reflective and transmissive portions, can be canceled.

In the liquid crystal display device 400 according to the second preferred embodiment described above, the difference between the electrode potential differences created in the reflective and transmissive portions is reduced by modifying the electrode structure of the reflective electrode region. On the other hand, in the liquid crystal display device 600 or 700 according to this third preferred embodiment, a voltage that can cancel the difference between the electrode potential differences is applied to the liquid crystal layer that includes portions with mutually different electrode potential differences (i.e., the reflective and transmissive portions). Thus, if these configurations are used in combination, the flicker can be made even less perceivable.

According to the second and third preferred embodiments of the present invention described above, the "counter voltage shift", which is caused by the difference between the electrode potential differences created in the reflective and transmissive portions of a dual-mode liquid crystal display device, can be substantially eliminated or at least compensated for sufficiently. However, as already described for the first preferred embodiment, it is difficult to control the offset voltage precisely enough to eliminate the counter voltage shift completely. Particularly in a dual-mode liquid crystal display device, it is hard to equalize the counter voltage shift in the reflective portion with that in the transmissive portion. For that reason, the first preferred embodiment is preferably combined with the second or third preferred embodiment. Especially when a liquid crystal display device is driven at a low frequency, even a slight counter shift voltage is likely to result in a quite perceivable flicker as already described for the first preferred embodiment. Thus, by combining the first preferred embodiment with the second or third preferred embodiment, the flicker can be made much less perceivable.

Various preferred embodiments of the present invention described above provide a liquid crystal display device that can display an image of quality with the power dissipation reduced significantly and without allowing the observer to perceive any flicker even when the device is driven at a low frequency of 45 Hz or less. Also, a dual-mode liquid crystal display device according to any of various preferred embodiments of the present invention described above adopts a hound's-tooth check arrangement of switching elements but still can display an image of quality without allowing the observer to perceive at least the zigzag line that is possibly formed by the transmissive electrode regions.

Furthermore, according to various preferred embodiments of the present invention described above, the flicker can be minimized even when the reflective and transmissive portions, provided for each pixel of a liquid crystal display device, create mutually different electrode potential differences. Thus, the quality of the image displayed is improved.

A liquid crystal display device according to any of various preferred embodiments of the present invention described above can be used effectively in various types of electronic appliances (e.g., portable or mobile appliances including cell phones, pocket game machines, personal digital assistants (PDAs), portable TV sets, remote controllers and notebook computers among other things). Particularly when the liquid crystal display device is built in a battery-driven electronic appliance, the appliance can be driven for a long time with its power dissipation reduced and yet can display an image of quality.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A liquid crystal display device comprising:

a plurality of pixel electrodes, each including a reflective electrode region and a transmissive electrode region;

a liquid crystal layer; and at least one counter electrode, which faces the pixel electrodes by way of the liquid crystal layer, wherein the pixel electrodes respectively define multiple pixels, each said pixel including a reflective portion that is defined by the reflective electrode region and a transmissive portion comprising the transmissive electrode region, wherein the reflective electrode region includes: a reflective conductive layer; and a transparent conductive layer which is provided on one surface of the reflective conductive layer so as to face the liquid crystal layer, wherein the transparent conductive layer is amorphous; and wherein the transparent conductive layer that is amorphous is provided on the liquid crystal layer side of the reflective conductive layer so that the transparent conductive layer is between at least the liquid crystal layer and the reflective conductive layer, and wherein the transparent conductive layer is located over a transmissive electrode that is provided at least partially in the transmissive portion so that the transparent conductive layer is provided between the liquid crystal layer and the transmissive electrode.

2. The liquid crystal display device of claim 1, wherein a difference in work function between the transparent conductive layer and the transmissive electrode region is within 0.3 eV.

3. The liquid crystal display device of claim 1, wherein the transmissive electrode region comprises an ITO layer, the reflective conductive layer includes an Al layer and the transparent conductive layer is made of an oxide layer mainly composed of indium oxide and zinc oxide.

4. The liquid crystal display device of claim 1, wherein the transparent conductive layer has a thickness of from 1 nm to 20 nm.

5. A liquid crystal display device comprising:

a pixel electrode including a reflective electrode region and a transmissive electrode region;

a liquid crystal layer; and at least one counter electrode, which faces the pixel electrode by way of the liquid crystal layer, wherein the pixel electrode defines a pixel of the liquid crystal display device, the pixel including a reflective portion that is defined by the reflective electrode region and a transmissive portion comprising the transmissive electrode region of the pixel electrode, wherein the reflective electrode region of the pixel includes: a reflective conductive layer that is substantially rectangular in shape when viewed from above; and a transparent conductive layer which is provided on at least part of a surface of the reflective conductive layer, wherein the reflective conductive layer is provided over a dielectric layer having an uneven upper surface, so that the reflective conductive layer also has an uneven upper surface that includes peaks and valleys defined therein;

wherein the transparent conductive layer is amorphous; and wherein the transparent conductive layer that is amorphous is provided on the liquid crystal layer side of the reflective conductive layer so that the transparent conductive layer is between at least the liquid crystal layer and the reflective conductive layer, and wherein the transparent conductive layer is located over a transmissive electrode that is provided at least partially in the transmissive portion so that the transparent conductive layer is provided between the liquid crystal layer and the transmissive electrode.

6. The liquid crystal display device of claim 5, wherein the reflective conductive layer comprises a first layer comprising Mo and a second layer comprising Al provided on and contacting the first layer comprising Mo.

7. The liquid crystal display device of claim 5, wherein the reflective conductive layer overlaps at least part of a TFT that is provided under the dielectric layer.

8. The liquid crystal display device of claim 5, wherein the transparent conductive layer comprises an oxide of indium.

9. The liquid crystal display device of claim 7, wherein the TFT is connected to a scanning line and a signal line, and the TFT is connected to the pixel electrode.

10. The liquid crystal display device of claim 7, wherein a contact hole in the dielectric layer which permits the pixel electrode to be electrically connected to the TFT is located under the reflective conductive layer.

11. A liquid crystal display device comprising:

a pixel electrode including a reflective electrode region and a transmissive electrode region;

a liquid crystal layer; and at least one counter electrode, which faces the pixel electrode by way of the liquid crystal layer, wherein the pixel electrode defines a pixel of the liquid crystal display device, the pixel including a reflective portion that is defined by the reflective electrode region and a transmissive portion comprising the transmissive electrode region of the pixel electrode, wherein the reflective electrode region of the pixel includes: a reflective conductive layer and a transparent conductive layer which is provided on at least part of a surface of the reflective conductive layer, wherein the reflective conductive layer is provided over a dielectric layer having an uneven upper surface, so that the reflective conductive layer also has an uneven upper surface that includes peaks and valleys therein;

wherein the reflective conductive layer overlaps at least part of a TFT that is provided under the dielectric layer, the TFT being electrically connected to the pixel electrode, and wherein a contact hole in the dielectric layer which permits the pixel electrode to be electrically connected to the TFT is located under the reflective conductive layer;

wherein the transparent conductive layer is amorphous; and wherein the transparent conductive layer that is amorphous is provided on the liquid crystal layer side of the reflective conductive layer so that the transparent conductive layer is between at least the liquid crystal layer and the reflective conductive layer, and wherein the transparent conductive layer is located over a transmissive electrode that is provided at least partially in the transmissive portion so that the transparent conductive layer is provided between the liquid crystal layer and the transmissive electrode.

12. The liquid crystal display device of claim 11, wherein the reflective conductive layer comprises a first layer comprising Mo and a second layer comprising Al provided on and contacting the first layer comprising Mo.

* * * * *